US011227726B2

(12) United States Patent
Komaba et al.

(10) Patent No.: US 11,227,726 B2
(45) Date of Patent: Jan. 18, 2022

(54) ELECTROLYTE SOLUTION FOR POTASSIUM ION BATTERY, POTASSIUM ION BATTERY, ELECTROLYTE SOLUTION FOR POTASSIUM ION CAPACITOR, AND POTASSIUM ION CAPACITOR

(71) Applicant: Tokyo University of Science Foundation, Tokyo (JP)

(72) Inventors: Shinichi Komaba, Tokyo (JP); Kei Kubota, Tokyo (JP); Tomooki Hosaka, Tokyo (JP)

(73) Assignee: Tokyo University of Science Foundation, Tokyo (JP)

( * ) Notice: Subject to any disclaimer, the term of this patent is extended or adjusted under 35 U.S.C. 154(b) by 399 days.

(21) Appl. No.: 16/479,783

(22) PCT Filed: Jan. 19, 2018

(86) PCT No.: PCT/JP2018/001621
§ 371 (c)(1),
(2) Date: Jul. 22, 2019

(87) PCT Pub. No.: WO2018/135627
PCT Pub. Date: Jul. 26, 2018

(65) Prior Publication Data
US 2021/0358695 A1     Nov. 18, 2021

(30) Foreign Application Priority Data
Jan. 23, 2017   (JP) .............................. JP2017-009526

(51) Int. Cl.
*H01G 11/06*     (2013.01)
*H01M 10/054*   (2010.01)
(Continued)

(52) U.S. Cl.
CPC .............. *H01G 11/06* (2013.01); *H01G 11/32* (2013.01); *H01G 11/60* (2013.01); *H01M 10/054* (2013.01); *H01M 10/0569* (2013.01)

(58) Field of Classification Search
CPC ... H01M 2300/0017; H01M 2300/002; H01M 2300/0025; H01M 2300/0028
See application file for complete search history.

(56) References Cited

U.S. PATENT DOCUMENTS

2014/0285153 A1* 9/2014 Fukunaga ................. H02J 7/00
                                                              320/127
2015/0050563 A1   2/2015 Yamada et al.
2017/0294676 A1  10/2017 Komaba et al.

FOREIGN PATENT DOCUMENTS

JP       2003-151549 A    5/2003
JP       2015-079636 A    4/2015
(Continued)

OTHER PUBLICATIONS

Yamada et al. "Review-Superconcentrated Electrolytes for Lithium Batteries", Journal of the Electrochemical Society, 162, A2406-A2423 (2015).
(Continued)

*Primary Examiner* — Cynthia H Kelly
*Assistant Examiner* — Monique M Wills
(74) *Attorney, Agent, or Firm* — Banner & Witcoff, Ltd.

(57) ABSTRACT

An electrolyte solution for a potassium ion battery or a potassium ion capacitor, the electrolyte solution comprising at least one potassium salt compound selected from the group consisting of potassium bis(trifluoromethanesulfonyl)amide and potassium bis(fluorosulfonyl)amide and at least one solvent selected from the group consisting of ethylene glycol dimethyl ether, diethylene glycol dimethyl ether, triethylene glycol dimethyl ether, tetraethylene glycol dimethyl ether, pentaethylene glycol dimethyl ether, ethylene
(Continued)

carbonate, and propylene carbonate, in which a concentration of the potassium salt compound in the electrolyte solution is from 1.5 mol/kg to 12.0 mol/kg.

10 Claims, 32 Drawing Sheets

(51) Int. Cl.
*H01M 10/0569* (2010.01)
*H01G 11/60* (2013.01)
*H01G 11/32* (2013.01)

(56) References Cited

FOREIGN PATENT DOCUMENTS

| JP | 2015-515081 A | 5/2015 |
|---|---|---|
| WO | 2013/146714 A1 | 10/2013 |
| WO | 2014/200012 A1 | 12/2014 |
| WO | 2016/059907 A1 | 4/2016 |

OTHER PUBLICATIONS

Vaalma, et al., "Non-Aqueous K-Ion Battery Based on Layered K0.3MnO2 and Hard Carbon/Carbon Black" Journal of the Electrochemical Society, 163(7), A1295-A1299 (2016).
Eftekhari, Ali. "Potassium secondary cell based on Prussian blue cathode", Journal of Power Sources, 126, 221-228 (2004).
Wang et al., "Superconcentrated electrolytes for a high-voltage lithium-ion battery" Nature Communications, 2016, vol. 7.
Apr. 17, 2018 (WO) International Search Report issued in International Application No. PCT/JP2018/001621.
Apr. 17, 2018 (WO) Written Opinion of the ISA issued in International Application No. PCT/JP2018/001621.
Oct. 12, 2018 (WO) International Preliminary Report on Patentability issued in International Application No. PCT/JP2018/001621.

* cited by examiner

ELECTROLYTE SOLUTION FOR POTASSIUM ION BATTERY, POTASSIUM ION BATTERY, ELECTROLYTE SOLUTION FOR POTASSIUM ION CAPACITOR, AND POTASSIUM ION CAPACITOR

RELATED APPLICATION DATA

This application is a National Stage Application under 35 U.S.C. 371 of co-pending PCT application number PCT/JP2018/001621 designating the United States and filed Jan. 19, 2018; which claims the benefit of JP application number 2017-009526 and filed Jan. 23, 2017 each of which are hereby incorporated by reference in their entireties.

TECHNICAL FIELD

The present invention relates to an electrolyte solution for a potassium ion battery, a potassium ion battery, an electrolyte solution for a potassium ion capacitor, and a potassium ion capacitor.

BACKGROUND ART

At present, as a high energy density secondary battery, a non-aqueous electrolyte secondary battery is widely used, for example, in which a non-aqueous electrolyte is used and lithium ions are transferred between a positive electrode and a negative electrode to perform charging and discharging.

In such non-aqueous electrolyte secondary batteries, generally, lithium transition metal complex oxide having a layered structure such as lithium nickelate ($LiNiO_2$) or lithium cobaltate ($LiCoO_2$) is used as a positive electrode, and a carbon material capable of absorbing and desorbing lithium, lithium metal, lithium alloy, or the like is used as a negative electrode (see, for example, Japanese Patent Application Laid-Open (JP-A) No. 2003-151549).

As a positive electrode of a non-aqueous electrolyte secondary battery, one described in Japanese National-Phase Publication (JP-A) No. 2015-515081 is known.

As a secondary battery that can be charged and discharged, a lithium ion secondary battery capable of achieving high energy density at high voltage have been mainly used so far, but the amount of lithium resources is relatively limited, and lithium is expensive. Lithium resources are localized in South America, and Japan relies entirely on imports from overseas. Under such circumstances, a sodium ion secondary battery replacing a lithium ion secondary battery is currently under development for cost reduction and stable supply of batteries. However, sodium has a larger atomic weight than lithium, a standard electrode potential of about 0.33 V higher than lithium, and a low cell voltage, and therefore, there is a problem that it is difficult to achieve high energy density.

As an electrolyte solution used for a lithium ion battery, those described in WO2013/146714 or Y. Yamada and A. Yamada, "Review-Superconcentrated Electrolytes for Lithium Batteries", *Journal of the Electrochemical Society*, 162, A2406-A2423 (2015) are known.

Recently, research on non-aqueous electrolyte secondary batteries using potassium ion instead of lithium ion and sodium ion has been started.

Since an electrode active material constituting a potassium ion secondary battery, in particular, a positive electrode active material must be a source of potassium ions, such an active material needs to be a potassium compound containing potassium as a constituent element. At present, as a positive electrode active material for a potassium ion secondary battery, for example, those consisting of crystalline $K_{0.3}MnO_2$ having a layered rock salt type structure (see Christoph Vaalma, et al., *Journal of The Electrochemical Society*, 163 (7), A1295-A1299 (2016)), those consisting of a Prussian blue-based material crystal (see Ali Eftekhari, *Journal of Power Souces*, 126, 221-228 (2004)), and the like are known.

SUMMARY OF INVENTION

Technical Problem

A problem to be solved by the invention is to provide an electrolyte solution for a potassium ion battery excellent in passivity formation, and a potassium ion battery including the electrolyte solution for a potassium ion battery.

Another problem to be solved by the invention is to provide an electrolyte solution for a potassium ion capacitor excellent in passivity formation, and a potassium ion capacitor including the electrolyte solution for a potassium ion capacitor.

Solution to Problem

The above-described problems are solved by the means described in <1>, <5>, <6>, or <10>.

<1> An electrolyte solution for potassium ion battery, the electrolyte solution containing at least one potassium salt compound selected from the group consisting of potassium bis(trifluoromethanesulfonyl)amide and potassium bis(fluorosulfonyl)amide and at least one solvent selected from the group consisting of ethylene glycol dimethyl ether, diethylene glycol dimethyl ether, triethylene glycol dimethyl ether, tetraethylene glycol dimethyl ether, pentaethylene glycol dimethyl ether, ethylene carbonate, and propylene carbonate, wherein a concentration of the potassium salt compound in the electrolyte solution is from 1.5 mol/kg to 12.0 mol/kg.

<2> The electrolyte solution for a potassium ion battery according to <1>, wherein the potassium salt compound includes potassium bis(fluorosulfonyl)amide.

<3> The electrolyte solution for a potassium ion battery according to <1> or <2>, wherein the solvent includes ethylene glycol dimethyl ether.

<4> The electrolyte solution for a potassium ion battery according to any one of <1> to <3>, wherein the concentration of the potassium salt compound in the electrolyte solution is from 6.0 mol/kg to 7.5 mol/kg.

<5> A potassium ion battery, including the electrolyte solution for a potassium ion battery according to any one of <1> to <4>.

<6> An electrolyte solution for a potassium ion capacitor, the electrolyte solution containing at least one potassium salt compound selected from the group consisting of potassium bis(trifluoromethanesulfonyl)amide and potassium bis(fluorosulfonyl)amide and at least one solvent selected from the group consisting of ethylene glycol dimethyl ether, diethylene glycol dimethyl ether, triethylene glycol dimethyl ether, tetraethylene glycol dimethyl ether, pentaethylene glycol dimethyl ether, ethylene carbonate, and propylene carbonate, wherein a concentration of the potassium salt compound in the electrolyte solution is from 1.5 mol/kg to 12.0 mol/kg.

<7> The electrolyte solution for a potassium ion capacitor according to <6>, wherein the potassium salt compound includes potassium bis(fluorosulfonyl)amide.

<8> The electrolyte solution for a potassium ion capacitor according to <6> or <7>, wherein the solvent includes ethylene glycol dimethyl ether.
<9> The electrolyte solution for a potassium ion capacitor according to any one of <6> to <8>, wherein the concentration of the potassium salt compound in the electrolyte solution is from 6.0 mol/kg to 7.5 mol/kg.
<10> A potassium ion capacitor, including the electrolyte solution for a potassium ion capacitor according to any one of <6> to <9>.

Advantageous Effects of Invention

According to the invention, an electrolyte solution for a potassium ion battery excellent in passivity formation, and a potassium ion battery including the electrolyte solution for a potassium ion battery can be provided.

According to the invention, an electrolyte solution for a potassium ion capacitor excellent in passivity formation, and a potassium ion capacitor including the electrolyte solution for a potassium ion capacitor can be provided.

DESCRIPTION OF EMBODIMENTS

Figure 1:
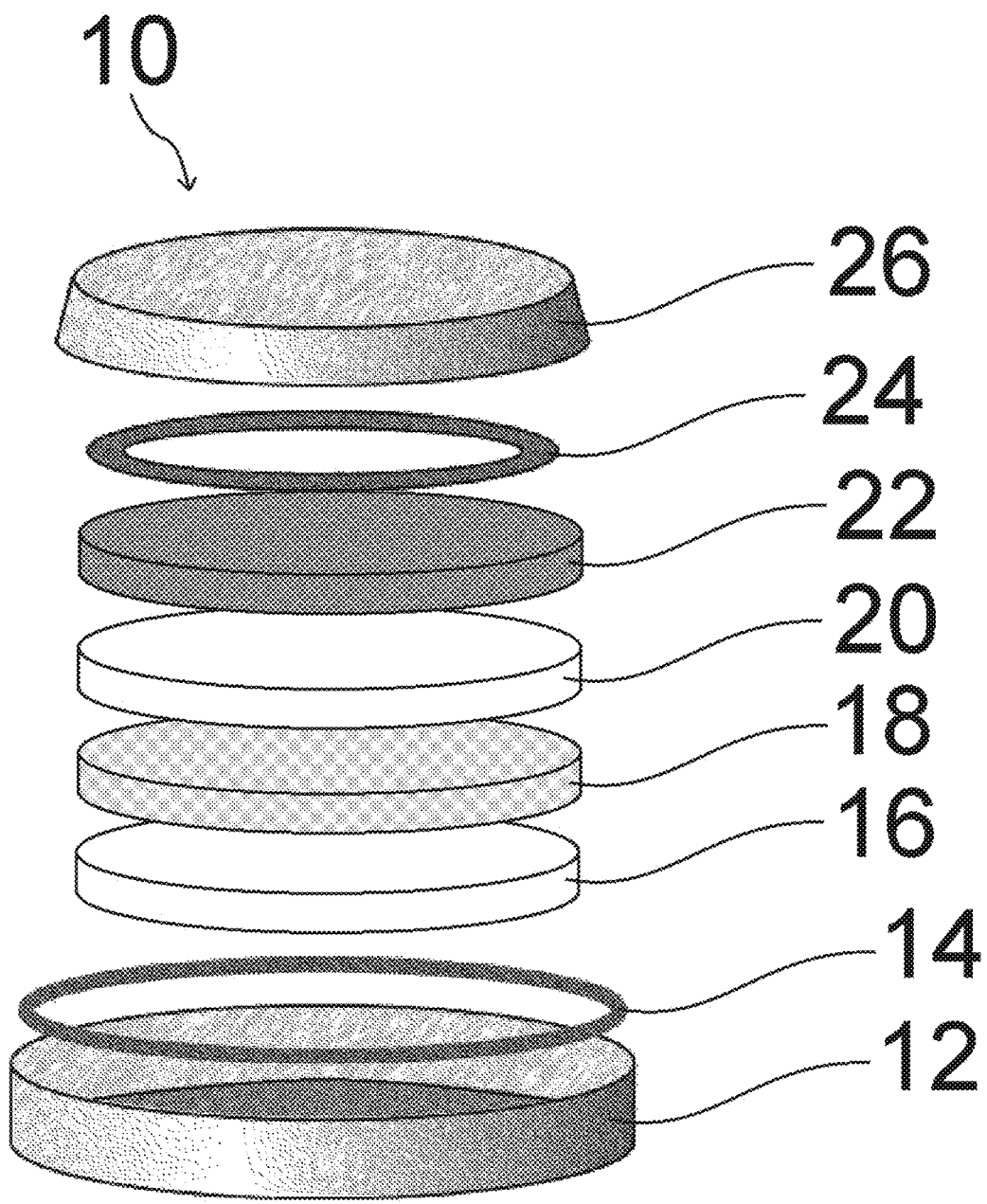
FIG. 1 is a schematic view showing an example of a potassium ion battery 10 according to the present embodiment.

Hereinafter, the contents of the invention will be described in detail. The description of the configuration requirements described below may be made based on the representative embodiments of the invention, but the invention is not limited to such embodiments. Herein, "from A to B" is used in the meaning including the numerical values A and B as the lower limit value and the upper limit, respectively.

In the embodiment, "% by mass" and "% by weight" are synonymous, and "parts by mass" and "parts by weight" are synonymous.

In the embodiment, a combination of two or more preferable aspects is a more preferable aspect.

(Electrolyte Solution for Potassium Ion Battery, and Electrolyte Solution for Potassium Ion Capacitor)

The electrolyte solution for a potassium ion battery or a potassium ion capacitor according to the present embodiment (hereinafter, also referred to as "electrolyte solution according to the present embodiment") contains at least one potassium salt compound selected from the group consisting of potassium bis(trifluoromethanesulfonyl)amide and potassium bis(fluorosulfonyl)amide and at least one solvent selected from the group consisting of ethylene glycol dimethyl ether, diethylene glycol dimethyl ether, triethylene glycol dimethyl ether, tetraethylene glycol dimethyl ether, pentaethylene glycol dimethyl ether, ethylene carbonate, and propylene carbonate, and a concentration of the potassium salt compound in the electrolyte solution is from 1.5 mol/kg to 12.0 mol/kg.

The electrolyte solution according to the present embodiment is used suitably as an electrolyte solution in a potassium ion battery or a potassium ion capacitor.

As mentioned above, the amount of lithium resources is relatively limited, and lithium is expensive. Lithium resources are localized in South America, and for example, Japan relies entirely on imports from overseas.

On the other hand, since potassium is abundantly contained in both seawater and the crust, potassium is a stable resource and can also reduce costs.

Specifically, the global production of lithium in 2012 is 34,970 t in terms of net content, and the production of potassium is 27,146 t in terms of net content.

Although in the case of a lithium ion battery, since lithium forms an alloy with various metals such as aluminum, expensive copper has to be used for a negative electrode substrate, potassium does not form an alloy with aluminum, and the use of inexpensive aluminum instead of copper for the negative electrode substrate is also a significant cost reduction advantage.

Since an electrolyte solution constituting a potassium ion battery or a potassium ion capacitor is responsible for transporting electrons between a positive electrode and a negative electrode via potassium ions, a potassium compound containing potassium as a constituent element needs to be contained.

By containing a specific potassium salt compound at a high concentration of from 1.5 mol/kg to 12.0 mol/kg, and containing a specific solvent, the electrolyte solution according to the present embodiment is excellent in passivity formation to a current collector, an active material, or the like. Since the electrolyte solution is excellent in passivity formation, for example, when an aluminum base material is used as a current collector, passivity is easily formed on the surface of the aluminum base material, and corrosion suppression of aluminum is excellent.

By containing a specific potassium salt compound at a high concentration of from 1.5 mol/kg to 12.0 mol/kg, and containing a specific solvent, the electrolyte solution according to the present embodiment has, in addition to the above, high ionic conductivity even when the concentration of an electrolyte (potassium salt compound) is high, and a potassium ion battery or a potassium ion capacitor in which co-insertion of an electrolyte into graphite is suppressed is obtained.

Co-insertion of an electrolyte into graphite is a phenomenon in which, when potassium ions are inserted between layers of graphite, the electrolyte is simultaneously co-inserted between the layers of graphite and decomposed, and deterioration of the graphite electrode and the electrolyte is suppressed by suppressing the co-insertion.

<Potassium Salt Compound>

The electrolyte solution according to the present embodiment contains at least one potassium salt compound selected from the group consisting of potassium bis(trifluoromethanesulfonyl)amide and potassium bis(fluorosulfonyl)amide.

Potassium bis(trifluoromethanesulfonyl)amide (KTFSA) is a compound shown below.

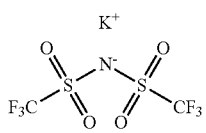

KTFSA

Potassium bis(fluorosulfonyl)amide (KFSA) is a compound shown below.

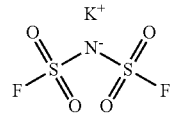

KFSA

It is preferable that the electrolyte solution according to the present embodiment contains potassium bis(fluorosulfonyl)amide from a viewpoint of a passivity formation, ionic conductivity, and co-insertion suppression of an electrolyte solution to graphite.

The concentration of the potassium salt compound in the electrolyte solution according to the present embodiment is, from the viewpoint of passivity formation, preferably from 3.0 mol/kg to 10.5 mol/kg, more preferably from 5.0 mol/kg to 9.0 mol/kg, and particularly preferably from 6.0 mol/kg to 7.5 mol/kg.

The concentration of the potassium salt compound in the electrolyte solution according to the present embodiment is, from the viewpoint of ionic conductivity, preferably from 1.8 mol/kg to 3.5 mol/kg, and more preferably from 2.0 mol/kg to 3.0 mol/kg.

Furthermore, the concentration of the potassium salt compound in the electrolyte solution according to the present embodiment is, from the viewpoint of battery characteristics and passivity formation, preferably from 6.0 mol/kg to 12.0 mol/kg.

The potassium salt compound contained in the electrolyte solution according to the present embodiment may be contained singly or in combination of two or more kind thereof, and is preferably contained singly.

<Solvent>

The electrolyte solution according to the present embodiment contains at least one solvent selected from the group consisting of ethylene glycol dimethyl ether, diethylene glycol dimethyl ether, triethylene glycol dimethyl ether, tetraethylene glycol dimethyl ether, pentaethylene glycol dimethyl ether, ethylene carbonate, and propylene carbonate.

From the viewpoint of passivity formation, ionic conductivity, and suppression of electrolyte solution co-insertion into graphite, the ratio of at least one solvent selected from the group consisting of ethylene glycol dimethyl ether, diethylene glycol dimethyl ether, triethylene glycol dimethyl ether, tetraethylene glycol dimethyl ether, pentaethylene glycol dimethyl ether, ethylene carbonate, and propylene carbonate among solvents contained in the electrolyte solution according to the present embodiment is, based on the total mass of solvents contained in the electrolyte solution, preferably 50% by mass or more, more preferably 80% by mass or more, yet more preferably 90% by mass or more, particularly preferably 95% by mass or more, and most preferably 99% by mass or more.

From the viewpoint of passivity formation, ionic conductivity, and suppression of electrolyte solution co-insertion into graphite, the solvent according to the present embodiment preferably contains at least one solvent selected from the group consisting of ethylene glycol dimethyl ether, ethylene carbonate, and propylene carbonate, and more preferably, contains ethylene glycol dimethyl ether.

From the viewpoint of battery characteristics, particularly coulombic efficiency, the solvent according to the present embodiment is preferably at least one solvent selected from the group consisting of ethylene glycol dimethyl ether, diethylene glycol dimethyl ether, triethylene glycol dimethyl ether, tetraethylene glycol dimethyl ether, and pentaethylene glycol dimethyl ether, and more preferably at least one solvent selected from the group consisting of triethylene glycol dimethyl ether and tetra ethylene glycol dimethyl ether.

The solvent may be used after being dehydrated with a dehydrating agent and then subjected to rectification.

Examples of the dehydrating agent include molecular sieves, sodium sulfate, magnesium sulfate, calcium hydride, sodium hydride, potassium hydride, and lithium aluminum hydride.

A solvent which has been dehydrated only by a dehydrating agent without rectification may be used.

The solvent contained in the electrolyte solution according to the present embodiment may be contained singly, or in combination of two or more kinds thereof.

The content of the solvent contained in the electrolyte solution according to the present embodiment is not particularly limited, and is preferably an amount satisfying the concentration range of the potassium salt compound.

<Other Components>

The electrolyte solution according to the present embodiment may contain another component other than the potassium salt compound and the solvent as needed.

As the other component, a known additive can be used, and examples thereof include fluoroethylene carbonate (FEC), vinylene carbonate (VC), and ethylene sulfite (ES).

Examples of the other component include a solvent other than those described above, an overcharge inhibitor, a dehydrating agent, and a deacidifying agent.

(Potassium Ion Battery)

The potassium ion battery according to the present embodiment is a potassium ion battery provided with the electrolyte solution for a potassium ion battery according to the present embodiment.

The potassium ion battery according to the present embodiment can be suitably used as a potassium ion secondary battery.

The potassium ion battery according to the present embodiment preferably includes the electrolyte solution for a potassium ion battery according to the present embodiment, a positive electrode, and a negative electrode, and more preferably includes the electrolyte solution for a potassium ion battery according to the present embodiment, a positive electrode, a negative electrode, and a separator.

The potassium ion battery according to the present embodiment preferably includes at least an aluminum member as a current collector or a case of an electrode.

In the potassium ion battery according to the present embodiment, various other known materials used in conventional lithium ion batteries and sodium ion batteries can also be used for elements such as structural materials other than a battery case, a spacer, a gasket, and a spring, and there is no particular limitation.

The potassium ion battery according to the present embodiment may be assembled according to a known method using the battery elements. In this case, the shape of a battery is also not particularly limited, and various shapes and sizes, such as cylindrical, square, and coin shapes, can be appropriately adopted.

<Positive Electrode>

The potassium ion battery according to the present embodiment preferably includes a positive electrode.

The positive electrode preferably includes a positive electrode active material for a potassium ion battery. The positive electrode may contain another compound other than the positive electrode active material for a potassium ion battery.

The other compounds are not particularly limited, and known additives used for preparing a positive electrode of a battery can be used. Specific examples thereof include a conductive aid, a binder, and a current collector.

From the viewpoint of durability and formability, it is preferable that the positive electrode contains the positive electrode active material for a potassium ion battery, a conductive aid, and a binder.

The shape and size of the positive electrode are not particularly limited, and may be any desired shape and size according to the shape and size of a battery used.

From the viewpoint of the output and charge-discharge capacity in a potassium ion battery, the positive electrode preferably contains, based on the total mass of the positive electrode for the potassium ion battery, a positive electrode active material for a potassium ion battery in an amount of 10% by mass or more, more preferably in an amount of 20% by mass or more, yet more preferably in an amount of 50% by mass or more, and particularly preferably in an amount of 70% by mass or more.

—Positive Electrode Active Material for Potassium Ion Battery—

The positive electrode active material for a potassium ion battery used in the embodiment is not particularly limited, and a known positive electrode active material for s potassium ion battery can be used.

Specific examples of the positive electrode active material for a potassium ion battery include a potassium salt of $K_xM_y[Fe(CN)_6]_z$ (M=Fe, Mn, Co, Ni, Cr, or Cu, x represents a number from 0 to 2, y represents a number from 0.5 to 1.5, and z represents a number from 0.5 to 1.5.), $KFeSO_4F$, an iron potassium phosphate compound, a vanadium potassium phosphate compound, activated carbon, $\alpha\text{-}FePO_4$, $K_{0.3}MnO_2$, and perylene anhydride.

The shape of the positive electrode active material for a potassium ion battery is not particularly limited as long as the shape is a desired shape, and is preferably a particulate positive electrode active material from the viewpoint of dispersibility when forming a positive electrode.

When the shape of the positive electrode active material for a potassium ion battery is particulate, from the viewpoint of dispersibility and durability of a positive electrode, the arithmetic mean particle size of the positive electrode active material for a potassium ion battery according to the present embodiment is preferably from 10 nm to 200 μm, more preferably from 50 nm to 100 μm, yet more preferably from 100 nm to 80 μm, and particularly preferably from 200 nm to 50 μm.

The arithmetic mean particle size can be suitably measured, for example, by using HORIBA Laser Scattering Particle Size Distribution Analyzer LA-950 manufactured by HORIBA, Ltd. in conditions of dispersion medium: water, and wavelength of laser used: 650 nm and 405 nm.

For a positive electrode described below, a positive electrode active material inside the positive electrode can be separated using a solvent or the like or physically separated and measurement can be performed.

—Conductive Aid—

The positive electrode active material for a potassium ion battery may be formed into a desired shape and used as it is as a positive electrode, and in order to improve the rate performance (output) of the positive electrode, the positive electrode preferably further includes a conductive aid.

Preferable examples of the conductive aid used for the embodiment include a carbon such as a carbon black, a graphite, a carbon nanotube (CNT), or a vapor growth carbon fiber (VGCF).

Examples of the carbon black include acetylene black, oil furnace carbon black, and Ketjen black. Among them, from the viewpoint of conductivity, at least one conductive aid selected from the group consisting of acetylene black and Ketjen black is preferable, and acetylene black or Ketjen black is more preferable.

The conductive aid may be used singly or in combination of two or more kinds thereof.

The mixing ratio of the positive electrode active material to the conductive aid is not particularly limited, and the content of the conductive aid in the positive electrode is, based on the total mass of the positive electrode active material contained in the positive electrode, preferably from 1% by mass to 80% by mass, more preferably from 2% by mass to 60% by mass, yet more preferably from 5% by mass to 50% by mass, and particularly preferably from 5% by mass to 25% by mass. When the content is in the above range, a positive electrode of higher output can be obtained, and the durability of the positive electrode is excellent.

As a method of mixing the conductive aid and the positive electrode active material, the positive electrode active material can be coated with the conductive aid by mixing the positive electrode active material with the conductive aid under an inert gas atmosphere. Nitrogen gas, argon gas, or the like can be used as an inert gas, and argon gas can be used suitably.

When mixing the conductive aid and the positive electrode active material, a pulverizing and dispersing treatment may be performed using a dry ball mill, a bead mill to which a dispersion medium such as a small amount of water is added, or the like. The adhesion and dispersibility of the conductive aid and the positive electrode active material can be improved by the pulverizing and dispersing treatment, and the electrode density can be increased.

—Binder—

The positive electrode used in the embodiment preferably further includes a binder from the viewpoint of formability.

The binder is not particularly limited, and a known binder can be used. Examples thereof include a polymer compound, and preferable examples thereof include a fluororesin, a polyolefin resin, a rubbery polymer, a polyamide resin, a polyimide resin (polyamide imide or the like), glutamic acid and a cellulose ether.

Specific examples of the binder include polyvinylidene fluoride (PVDF), vinylidene fluoride-hexafluoropropylene fluororubber (VDF-HFP fluororubber), vinylidene fluoride-hexafluoropropylene-tetrafluoroethylene-based fluororubber (VDF-HFP-TFE-based fluororubber), polyethylene, aromatic polyamide, cellulose, styrene-butadiene rubber, isoprene rubber, butadiene rubber, ethylene-propylene rubber, styrene-butadiene-styrene block copolymer, a hydrogenated substance thereof, styrene-ethylene-butadiene-styrene copolymer, styrene-isoprene-styrene block copolymer, a hydrogenated substance thereof, syndiotactic-1,2-polybutadiene, ethylene-vinyl acetate copolymer, propylene-α-olefin (carbon number: from 2 to 12) copolymer, glutamic acid, starch, methyl cellulose, carboxymethyl cellulose, hydroxymethyl cellulose, hydroxyethyl cellulose, hydroxypropyl cellulose, carboxymethyl hydroxyethyl cellulose, nitrocellulose, polyacrylic acid, sodium polyacrylate, and polyacrylonitrile.

From the viewpoint of increasing the electrode density, the specific gravity of a compound used as the binder is preferably greater than 1.2 g/cm$^3$.

From the viewpoint of increasing the electrode density and the adhesion, the weight average molecular weight of the binder is preferably 1,000 or more, more preferably 5,000 or more, and yet more preferably, 10,000 or more. There is no particular upper limit, and is preferably 2,000,000 or less.

The binder may be used singly or in combination of two or more kinds thereof.

The mixing ratio of the positive electrode active material and the binder is not particularly limited, and the content of the binder in the positive electrode is, with respect to the total mass of the positive electrode active material contained in the positive electrode, preferably from 0.5% by mass to 30% by mass, more preferably from 1% by mass to 20% by mass, and yet more preferably from 2% by mass to 15% by mass. When the content is in the above range, the formability and durability are excellent.

There is no particular limitation on a method of manufacturing a positive electrode containing a positive electrode active material, a conductive aid, and a binder, and for example, the manufacturing method may be a method in which a positive electrode active material, a conductive aid, and a binder are mixed, and pressure molding is performed, or a method in which a slurry described below is prepared, and a positive electrode is formed.

—Current Collector—

The positive electrode used in the embodiment preferably further includes a current collector.

Examples of the current collector include a foil made of a conductive material such as nickel, aluminum, or stainless steel (SUS), a mesh, an expanded grid (expanded metal), and a punched metal. The openings of the mesh, the wire diameter, the number of meshes, and the like are not particularly limited, and conventionally known ones can be used.

The shape of the current collector is not particularly limited, and may be selected in accordance with a desired shape of the positive electrode. Examples of the shape include foil-like and plate-like shapes.

Among them, an aluminum current collector is preferable as a current collector.

The method of forming a positive electrode on a current collector is not particularly limited, and examples thereof include a method of mixing a positive electrode active material, a conductive aid, a binder, and an organic solvent or water to prepare a positive electrode active material slurry and coating the slurry on the current collector. Examples of the organic solvent include an amine-based solvent such as N,N-dimethylaminopropylamine or diethyltriamine; an ether-based solvent such as ethylene oxide or tetrahydrofuran; a ketone-based solvent such as methyl ethyl ketone; an ester-based solvent such as methyl acetate, and an aprotic polar solvent such as dimethylacetamide or N-methyl-2-pyrrolidone.

A positive electrode is manufactured by, for example, applying the prepared slurry onto a current collector, fixing the slurry by pressing after drying and the like. Examples of the method of applying a slurry on a current collector include slit die coating, screen coating, curtain coating, knife coating, gravure coating, and electrostatic spraying.

<Negative Electrode>

The potassium ion battery according to the present embodiment preferably includes a negative electrode.

The negative electrode used in the embodiment may be any one containing a negative electrode active material, and examples thereof include those made of a negative electrode active material, and a current collector and a negative electrode active material layer formed on the surface of the current collector, wherein the negative electrode active material layer contains a negative electrode active material and a binder.

The current collector is not particularly limited, and the current collector described above in the positive electrode can be suitably used. Among others, an aluminum current collector is preferable.

The shape and size of the negative electrode are not particularly limited, and may be any desired shape and size in accordance with the shape and size of a battery used.

Examples of the negative electrode active material include a carbon material such as natural graphite, artificial graphite, a coke, hard carbon, carbon black, a pyrolytic carbon, a carbon fiber, or a sintered product of an organic polymer compound, $KTi_2(PO_4)_3$, P, Sn, Sb, and a MXene (composite atom layer material). The shape of the carbon material may be, for example, a flaky shape such as natural graphite, a sphere shape such as a mesocarbon microbead, a fiber shape such as graphitized carbon fiber, or a particulate aggregate. Here, the carbon material may function as a conductive aid.

Among them, graphite or hard carbon is preferable, and graphite is more preferable.

Potassium metal can also be suitably used as the negative electrode active material.

Furthermore, as the negative electrode, the negative electrode described in WO 2016/059907 can also be suitably used.

Graphite in the embodiment refers to a graphite-based carbon material. Examples of the graphite-based carbon material include natural graphite, artificial graphite, and expanded graphite.

As natural graphite, for example, scaly graphite, massive graphite, and the like can be used. As artificial graphite, for example, bulk graphite, vapor grown graphite, flake graphite, fibrous graphite, and the like can be used. Among these, scaly graphite and massive graphite are preferable because of high packing density and the like. Two or more types of graphite may be used in combination.

The average particle diameter of the graphite is, as an upper limit, preferably 30 µm, more preferably 15 µm, and yet more preferably 10 µm, and, as a lower limit, preferably 0.5 µm, more preferably 1 µm, and yet more preferably 2 µm. The average particle size of the graphite is a value measured by a method of electron microscope observation.

Examples of the graphite include one having an interplanar spacing d (002) of from 3.354 to 3.370 Å (angstrom, 1 Å=0.1 nm) and a crystallite size Lc of 150 Å or more.

The hard carbon in the embodiment is a carbon material in which the layering order hardly changes even when heat-treated at a high temperature of 2,000° C. or higher, and is also referred to as non-graphitizable carbon. Examples of the hard carbon include carbon fiber obtained by carbonizing infusible fiber, which is an intermediate product of carbon fiber manufacturing process, at about from 1,000° C. to 1,400° C. and a carbon material carbonized at about from 1,000° C. to 1,400° C. after air oxidation of an organic compound at about 150° C. to 300° C. The method of manufacturing a hard carbon is not particularly limited, and a hard carbon manufactured by a conventionally known method can be used.

The average particle diameter, the true density, the surface spacing of the (002) plane, and the like of the hard carbon are not particularly limited, and preferred ones can be selected and used as appropriate.

The negative electrode active material may be used singly or in combination of two or more kinds thereof.

The content of the negative electrode active material in the negative electrode active material layer is not particularly limited, and is preferably from 80 to 95% by mass.

<Separator>

The potassium ion battery according to the present embodiment preferably further includes a separator.

The separator physically isolates a positive electrode and a negative electrode to prevent an internal short circuit.

The separator is made of a porous material, pores of which are impregnated with an electrolyte, and have ion permeability (in particular, at least potassium ion permeability) in order to ensure cell reaction.

As the separator, for example, in addition to a porous membrane made of a resin, a non-woven fabric can be used. The separator may be formed of only a porous membrane layer or a non-woven fabric layer, or may be formed of a layered body of a plurality of layers different in composition and form. Examples of the layered body include a layered body having a plurality of resin porous layers different in composition, and a layered body having a porous membrane layer and a non-woven fabric layer.

The material of the separator can be selected in consideration of the operating temperature of a battery, the composition of an electrolyte, and the like.

Examples of a resin contained in a fiber forming a porous film and a nonwoven fabric include a polyolefin resin such as polyethylene, polypropylene, or ethylene-propylene copolymer; a polyphenylene sulfide resin such as polyphenylene sulfide or polyphenylene sulfide ketone; a polyamide resin such as an aromatic polyamide resin (aramid resin or the like); and a polyimide resin. These resins may be used singly, or two or more kinds thereof may be used in combination. The fiber forming the nonwoven fabric may be an inorganic fiber such as a glass fiber.

The separator is preferably a separator containing at least one material selected from the group consisting of glass, a polyolefin resin, a polyamide resin, and a polyphenylene sulfide resin. Among them, a more preferred example of the separator is a glass filter (glass filter paper).

The separator may contain an inorganic filler.

Examples of the inorganic filler include ceramics (silica, alumina, zeolite, titania and the like), talc, mica, and wollastonite. The inorganic filler is preferably particulate or fibrous.

The content of the inorganic filler in the separator is preferably from 10% by mass to 90% by mass, and more preferably from 20% by mass to 80% by mass.

The shape and size of the separator are not particularly limited, and may be appropriately selected in accordance with a desired battery shape and the like.

Although the potassium ion battery shown in FIG. 1 is exemplified as an example of the potassium ion battery according to the present embodiment, it is needless to say that the invention is not limited thereto.

FIG. 1 is a schematic view showing an example of a potassium ion battery 10 according to the present embodiment.

The potassium ion battery 10 shown in FIG. 1 is a coin type battery, and is formed by overlapping a battery case 12 on the negative electrode side, a gasket 14, a negative electrode 16, a separator 18, a positive electrode 20, a spacer 22, a spring 24, and a battery case 26 on the positive electrode side sequentially from the negative electrode side, and fitting the battery case 12 and the battery case 26 together.

The separator 18 is impregnated with an electrolyte solution (not shown) according to the present embodiment.

(Potassium Ion Capacitor)

The potassium ion capacitor according to the present embodiment includes the electrolyte solution for a potassium ion capacitor according to the present embodiment.

The potassium ion capacitor according to the present embodiment can be basically prepared, for example, in the same configuration as that of a conventional lithium ion capacitor except that the electrolyte solution for a potassium ion capacitor according to the present embodiment is used as an electrolyte solution and potassium ion is used in place of lithium ion.

In the potassium ion battery, each component described above can also be suitably used for the potassium ion capacitor according to the present embodiment.

EXAMPLES

Hereinafter, the invention will be more specifically described by way of Examples. The materials, amounts used, proportions, treatment contents, treatment procedures, and the like shown in the following Examples can be changed as appropriate without departing from the spirit of the invention. Accordingly, the scope of the invention is not limited to the specific Examples shown below.

Examples 1 to 3, and Comparative Examples 1 and 2

Each electrolyte solution was prepared by mixing the potassium salt compound shown below and a solvent in such a manner that the solution has the concentration of the potassium salt compound shown below.

Example 1: 6.5 mol/kg solution of potassium bis(fluorosulfonyl)amide in ethylene glycol dimethyl ether (6.5 mol/kg KFSA/DME)

Example 2: 6 mol/kg solution of potassium bis(trifluoromethanesulfonyl)amide in ethylene glycol dimethyl ether (6 mol/kg KTFSA/DME)

Example 3: 10 mol/kg solution of potassium bis(fluorosulfonyl)amide in ethylene carbonate:propylene carbonate (volume ratio 1:1) (10 mol/kg KFSA/EC:PC)

Comparative Example 1: 1 mol/dm$^3$ (also described as 1 mol/L or 1 moldm$^{-3}$) solution of potassium bis(fluorosulfonyl)amide in ethylene carbonate:diethyl carbonate (volume ratio 1:1) (1 mol/dm$^3$ KFSA/EC:DEC)

Comparative Example 2: 1 mol/dm$^3$ solution of potassium bis(trifluoromethanesulfonyl)amide in ethylene carbonate:diethyl carbonate (volume ratio 1:1) (1 mol/dm$^3$ KTFSA/EC:DEC)

Details of the compounds used are shown below.

Potassium bis(fluorosulfonyl)amide (KFSA): manufactured by KANTO CHEMICAL CO., INC. or manufactured by SOLVIONIC SA Potassium bis(trifluoromethanesulfonyl)amide (KTFSA): manufactured by KANTO CHEMICAL CO., INC.

Ethylene glycol dimethyl ether (DME): manufactured by Kishida Chemical Co., Ltd.

Ethylene carbonate (EC): manufactured by Kishida Chemical Co., Ltd.

Propylene carbonate (PC): manufactured by Kishida Chemical Co., Ltd.

Diethyl carbonate (DEC): manufactured by Kishida Chemical Co., Ltd.

<Passivity Formation (Aluminum Corrosion) Evaluation>

—Cyclic Voltammetry (CV) Measurement—

A cyclic voltammetry (CV) measurement was performed using each obtained electrolyte solution.

Using each of the obtained electrolyte solutions, CV measurement was performed at a scan rate of 0.5 mV/s and at a sweep range of voltage of from 2.0 V to 4.0 V, 4.3 V, 4.6 V, or 4.9 V using an aluminum foil for the working electrode and potassium metal (manufactured by Aldrich Company) for the counter electrode. In Example 3, the voltage was swept also at from 2.0 V to 5.2 V.

In the CV measurement, since oxidation current is generated along with corrosion of aluminum, the smaller the current density to be measured, the more excellent the corrosion suppression of aluminum and the more excellent the passivity formation.

The evaluation results are shown in FIGS. 2 to 9.

In FIGS. 2 to 9, the ordinate represents current density (unit: mA/cm$^2$), and the abscissa represents potential (Voltage, unit: V (V vs. K/K$^+$)) based on the standard unipolar potential of potassium metal.

Figure 2:
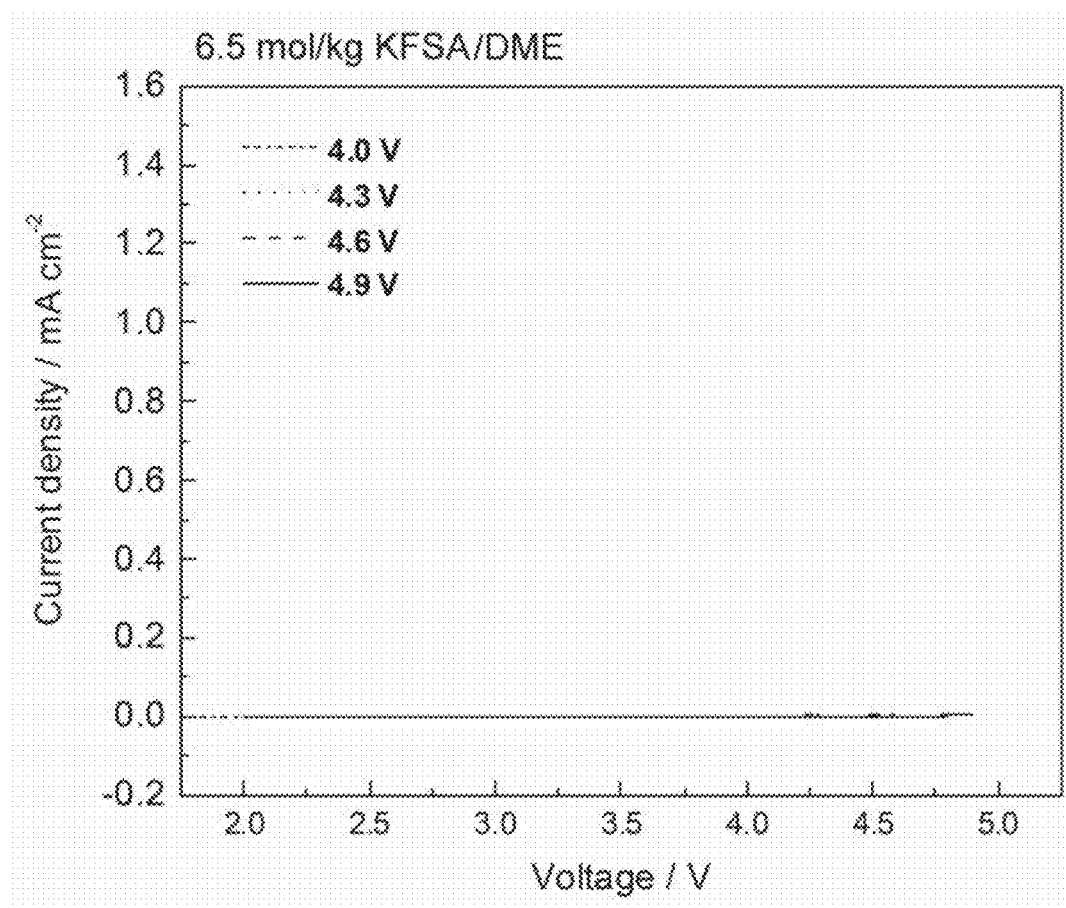
FIG. 2 shows cyclic voltammetry (CV) curves when an electrolyte solution of Example 1 is used.

FIG. 2 shows cyclic voltammetry (CV) curves when an electrolyte solution of Example 1 is used.

Figure 3:
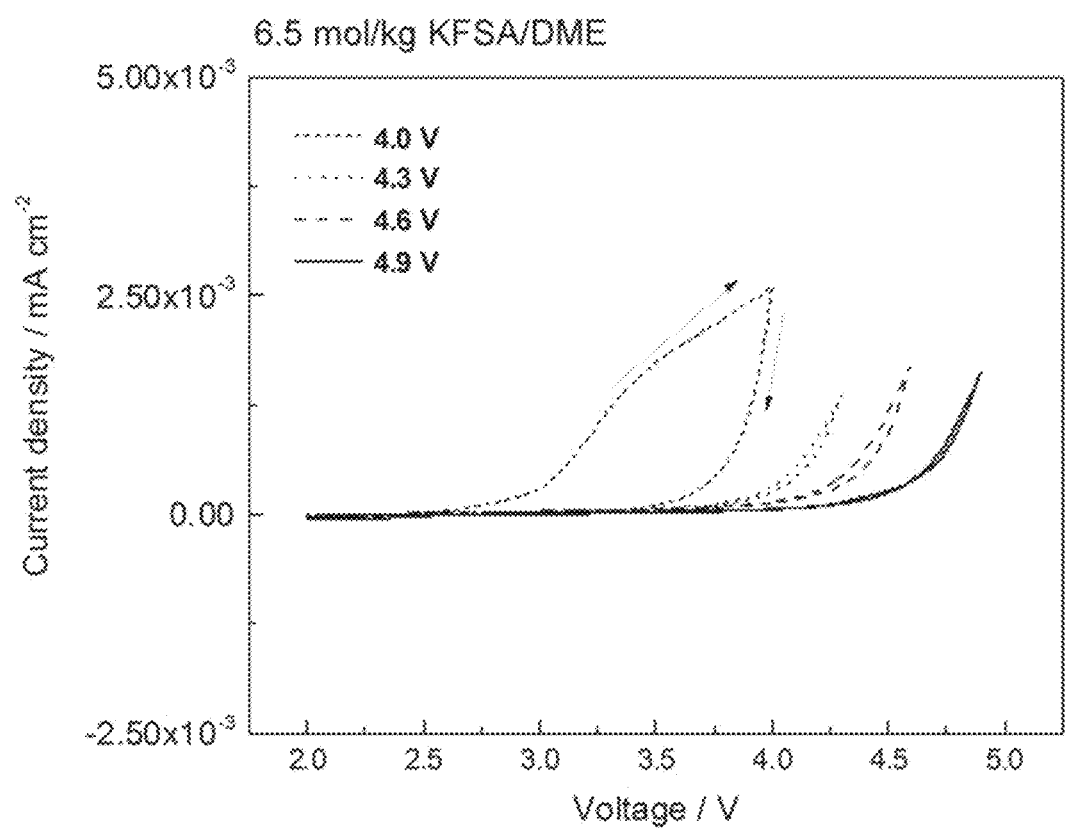
FIG. 3 shows an enlarged view of CV curves when an electrolyte solution of Example 1 is used.

FIG. 3 shows an enlarged view of CV curves when an electrolyte solution of Example 1 is used.

Figure 4:
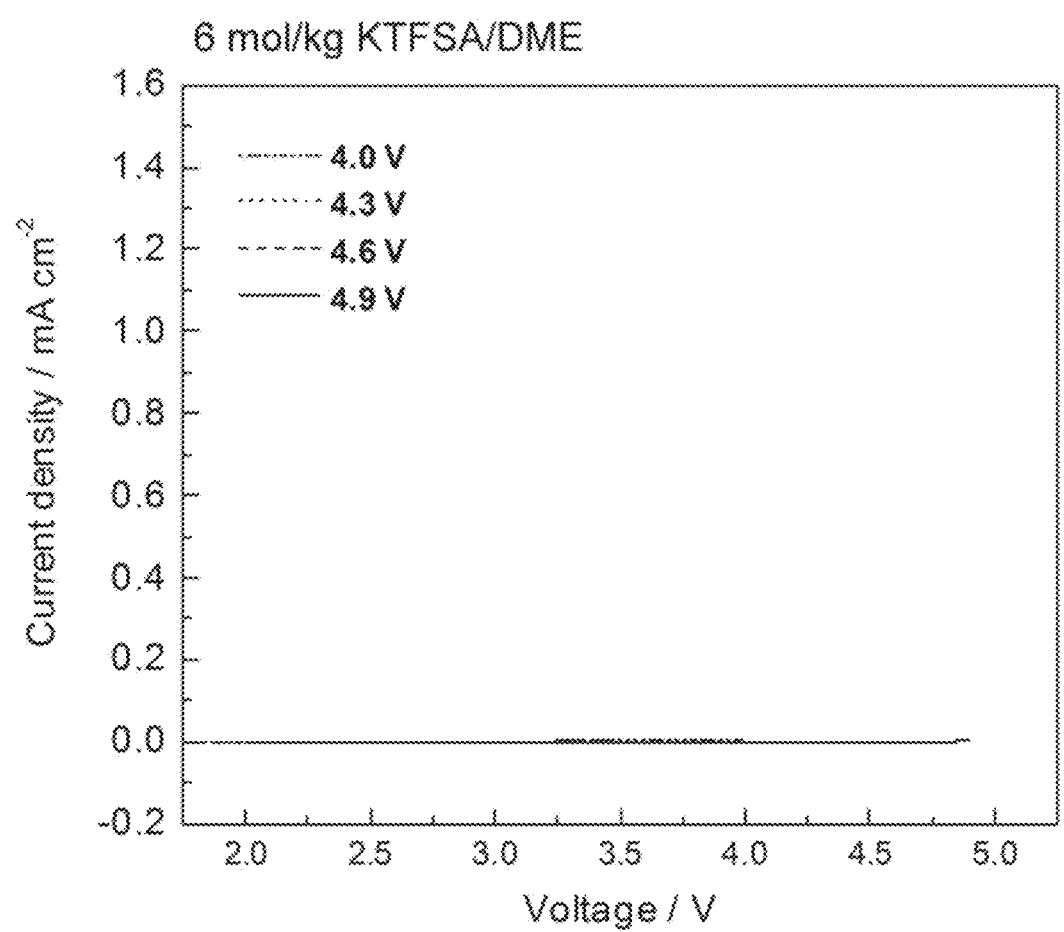
FIG. 4 shows CV curves when an electrolyte solution of Example 2 is used.

FIG. 4 shows CV curves when an electrolyte solution of Example 2 is used.

Figure 5:
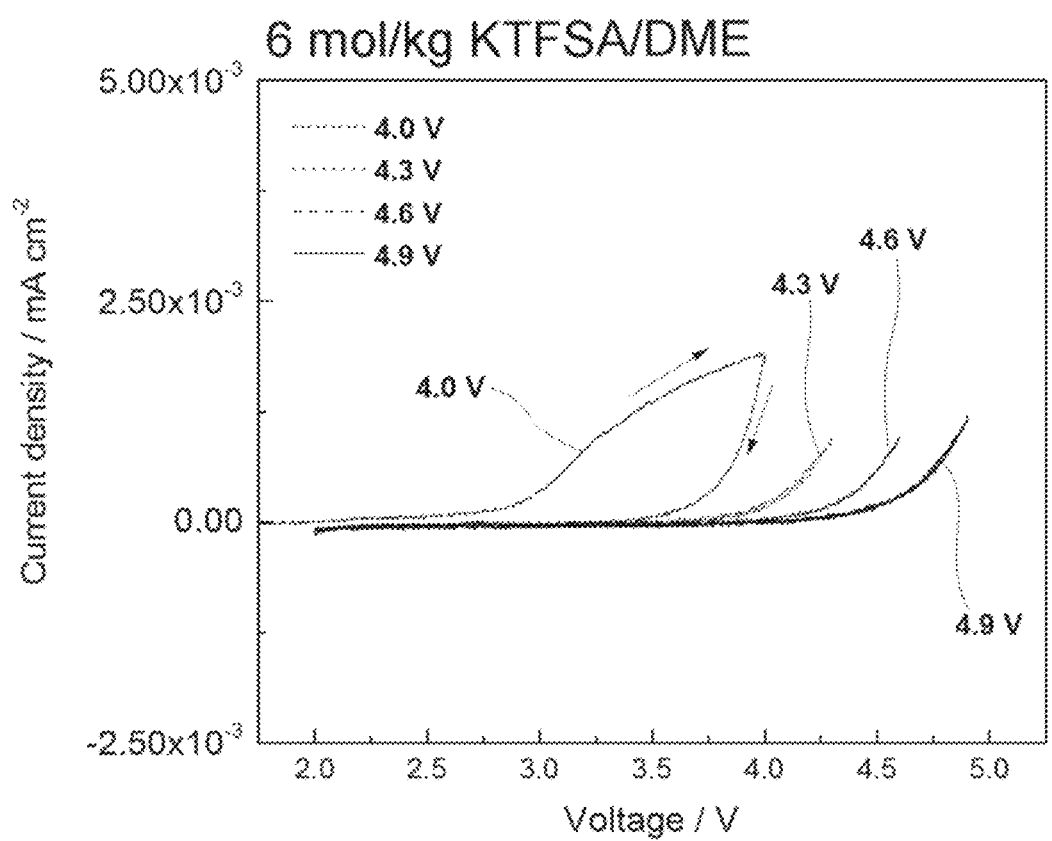
FIG. 5 shows an enlarged view of CV curves when an electrolyte solution of Example 2 is used.

FIG. 5 shows an enlarged view of CV curves when an electrolyte solution of Example 2 is used.

Figure 6:
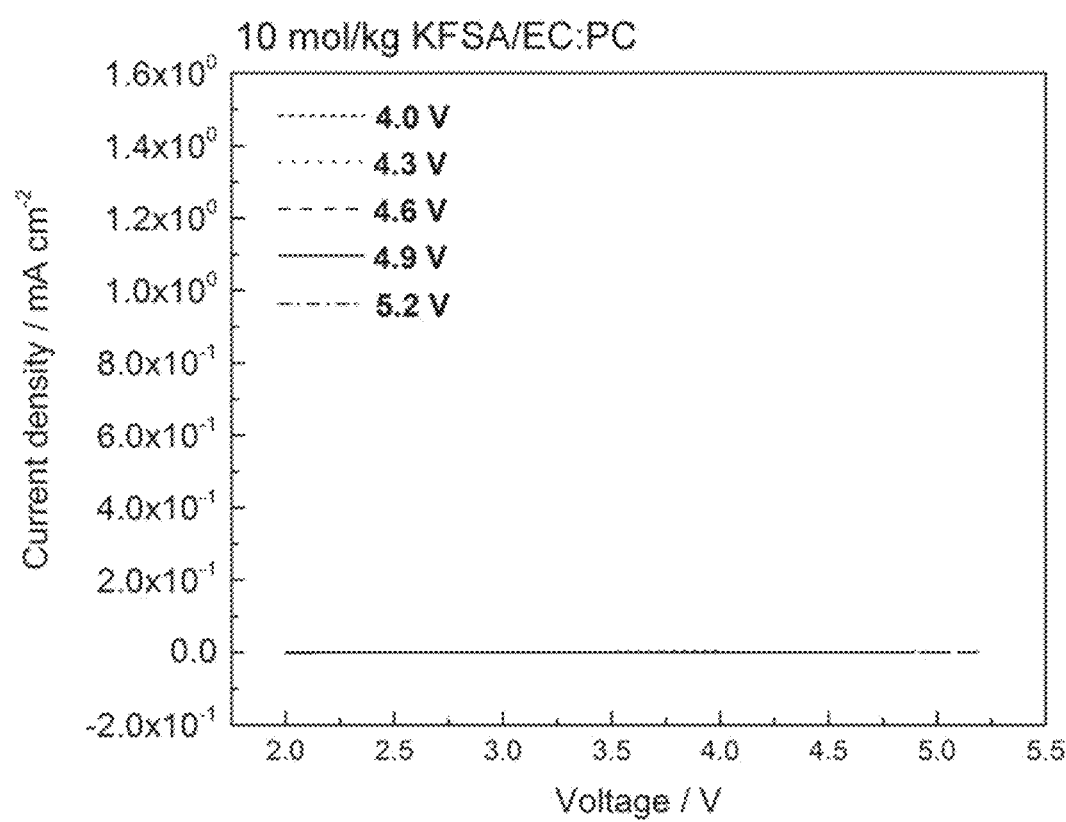
FIG. 6 shows CV curves when an electrolyte solution of Example 3 is used.

FIG. 6 shows CV curves when an electrolyte solution of Example 3 is used.

Figure 7:
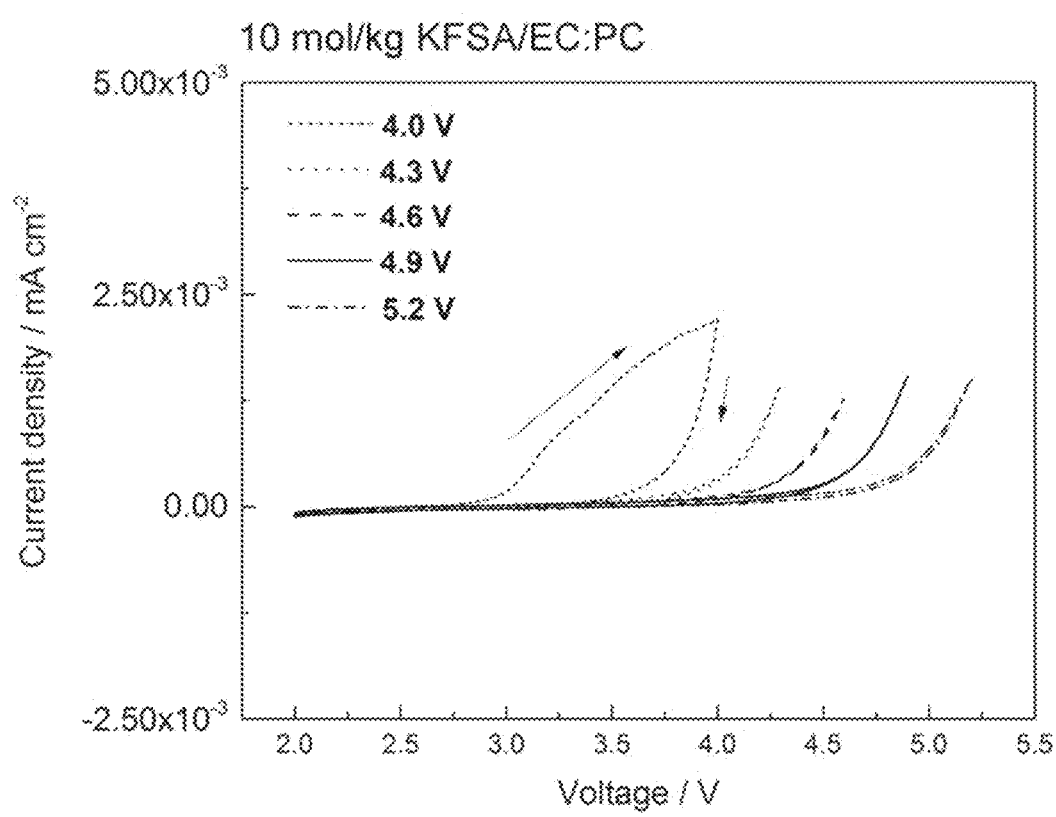
FIG. 7 shows an enlarged view of CV curves when an electrolyte solution of Example 3 is used.

FIG. 7 shows an enlarged view of CV curves when an electrolyte solution of Example 3 is used.

Figure 8:
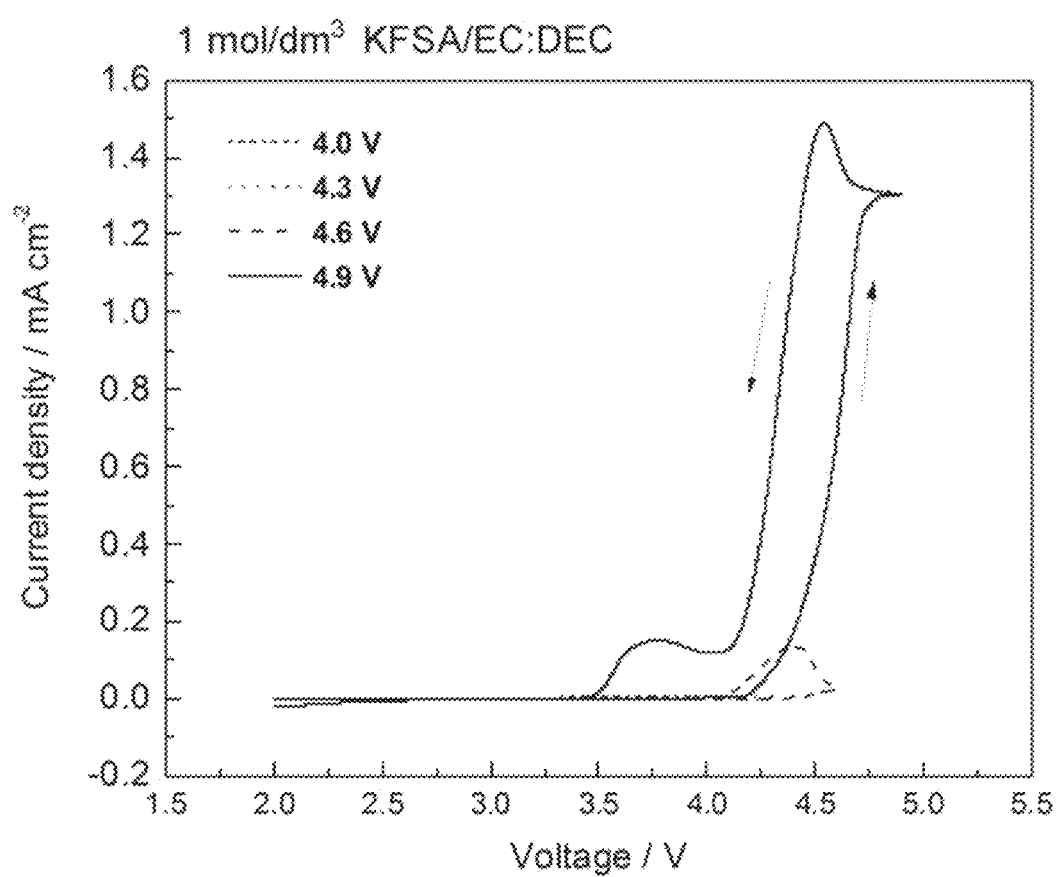
FIG. 8 shows CV curves when an electrolyte solution of Comparative Example 1 is used.

FIG. 8 shows CV curves when an electrolyte solution of Comparative Example 1 is used.

Figure 9:
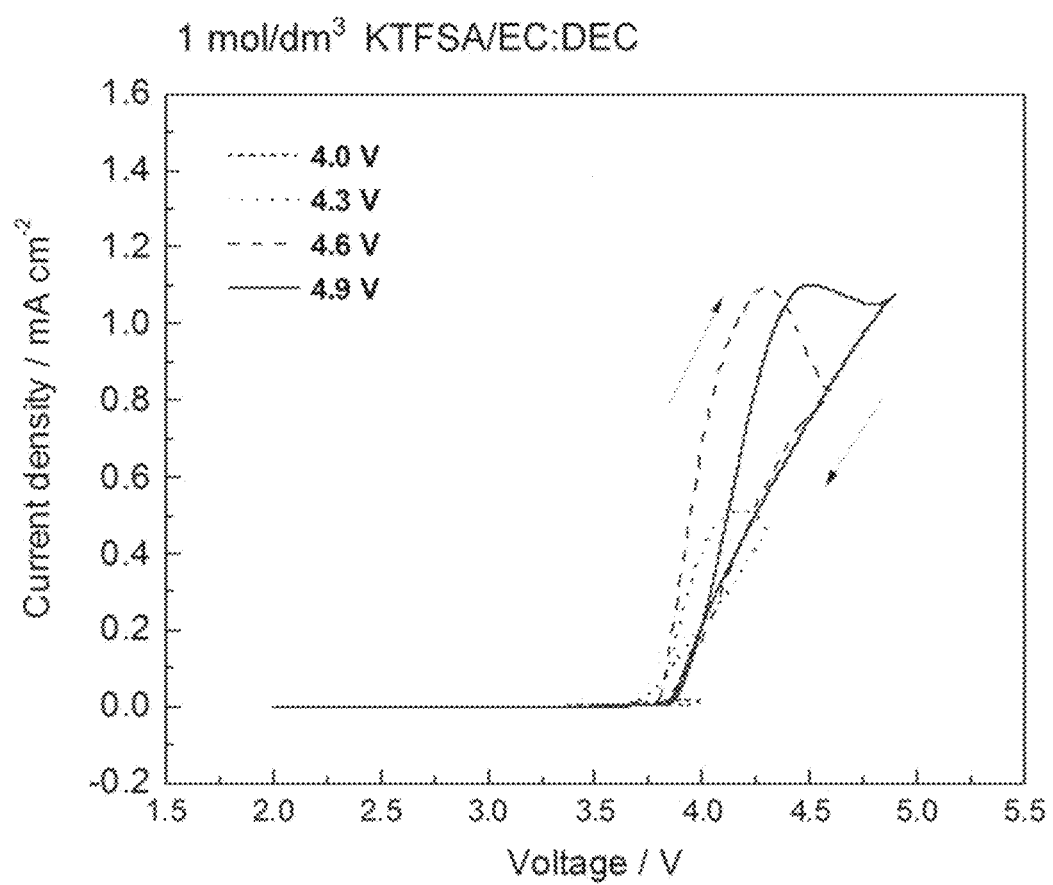
FIG. 9 shows CV curves when an electrolyte solution of Comparative Example 2 is used.

FIG. 9 shows CV curves when an electrolyte solution of Comparative Example 2 is used.

As shown in FIGS. 2 to 7, the electrolyte solution according to the present embodiment is excellent in the corrosion suppression of aluminum and excellent in the passivity formation.

On the other hand, as shown in FIGS. 8 and 9, in the electrolyte solutions of Comparative Examples 1 and 2, corrosion of aluminum was largely observed, and the passivity formation was poor.

Reference Example 1

<Measurement of Ionic Conductivity>

The ionic conductivity was measured for a solution of potassium bis(fluorosulfonyl)amide in ethylene glycol dimethyl ether (KFSA/DME), a solution of potassium bis(trifluoromethanesulfonyl)amide in ethylene glycol dimethyl ether (KTFSA/DME), and a solution of potassium bis(fluorosulfonyl)amide in ethylene carbonate:propylene carbonate (volume ratio 1:1) (KFSA/EC:PC) by changing the concentration of each potassium salt compound.

The ionic conductivity was measured at room temperature using Eutech CON2700 manufactured by Nikko Hansen & Co., Ltd.

Propylene carbonate used was manufactured by Kishida Chemical Co., Ltd.

Figure 10:
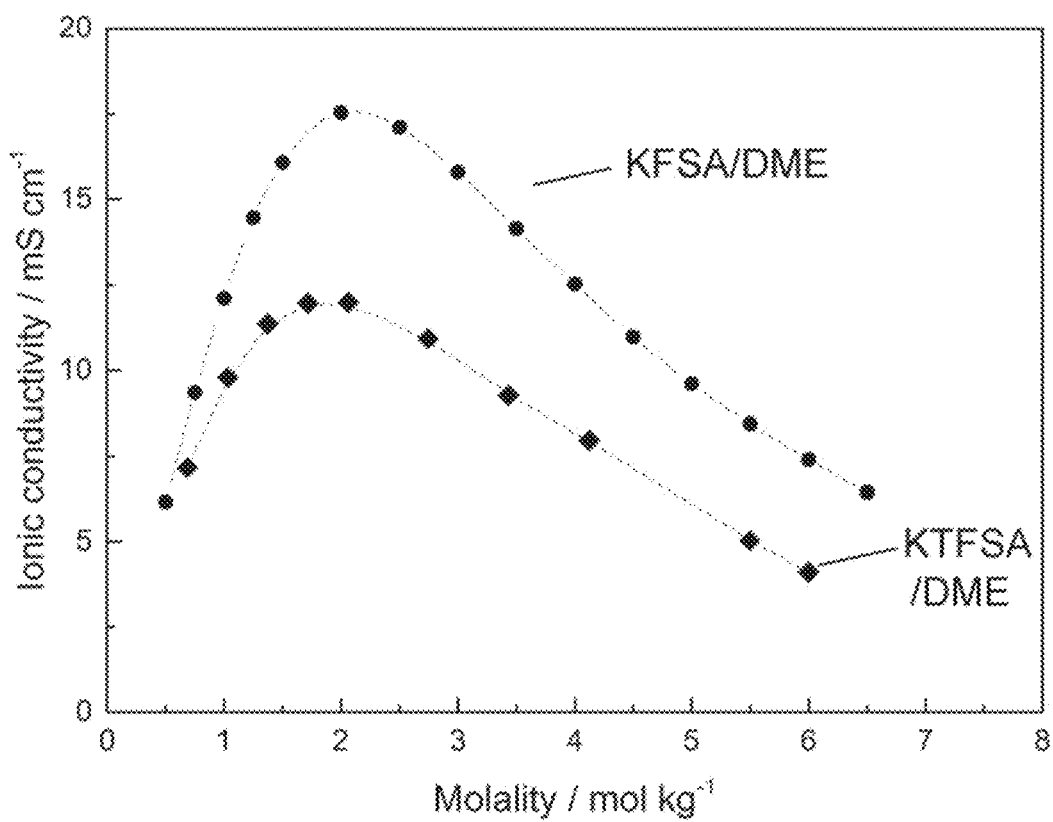
FIG. 10 is a graph showing the relationship between the concentration of a potassium salt compound and the ionic conductivity for KFSA/DME and KTFSA/DME.
Figure 11:
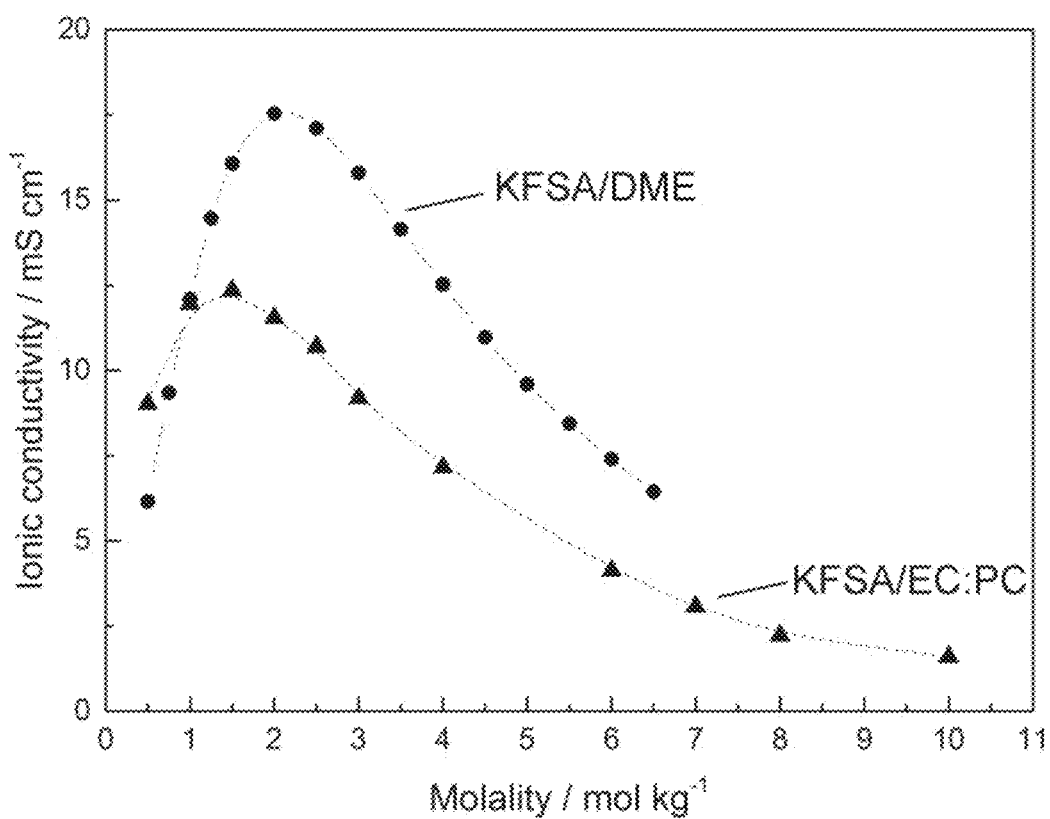
FIG. 11 is a graph showing the relationship between the concentration of a potassium salt compound and the ionic conductivity for KFSA/DME and KFSA/EC:PC.

The measurement results are shown in FIGS. 10 and 11. The ordinate in FIGS. 10 and 11 represents the ionic conductivity (Ionic conductivity, unit: mScm$^{-1}$), and the abscissa represents the concentration of potassium ion compound (Molality, unit: molkg$^{-1}$).

FIG. 10 is a graph showing the relationship between the concentration of a potassium salt compound and the ionic conductivity for KFSA/DME and KTFSA/DME.

FIG. 11 is a graph showing the relationship between the concentration of a potassium salt compound and the ionic conductivity for KFSA/DME and KFSA/EC:PC.

As shown in FIGS. 10 and 11, when the concentration of the potassium ion compound is around 2 mol/kg, the ionic conductivity has a maximum value, and even in the high concentration region (3 mol/kg or more) in which the ionic conductivity tends to decrease in a conventional electrolyte solution, the ionic conductivity shows a high value, and therefore, the electrolyte solution according to the present embodiment is also excellent in the ionic conductivity.

Example 4 and Comparative Example 3

<Preparation of Positive Electrode>

A positive electrode was prepared by applying a mixture of KFeSO$_4$F, Ketjen black (KB, manufactured by Lion Specialty Chemicals Co., Ltd.), and PVdF (polyvinylidene fluoride resin, manufactured by Kureha Corporation, W #1100) at a mass ratio of 80:10:10 on aluminum foil (manufactured by Hosen Co., Ltd., thickness: 0.017 mm). The shape of a positive electrode not containing aluminum foil was a cylindrical shape having a diameter of 10 mm and a thickness of from 0.03 mm to 0.04 mm. The mass of a positive electrode not containing aluminum foil was from 1 mg to 3 mg.

<Measurement of Charging and Discharging>

Measurement of charging and discharging was performed in a coin cell prepared using the electrolyte solution below as an electrolyte solution, the positive electrode prepared above as a positive electrode, potassium metal (manufactured by Aldrich Company) as a negative electrode, and a separator (glass filter paper, manufactured by Advantec Toyo Kaisha, Ltd.), an SUS-Al clad battery case, a polypropylene gasket (CR2032 manufactured by Hosen Co., Ltd.), a spacer (material: SUS, diameter 16 mm×height 0.5 mm, manufactured by Hosen Co., Ltd.), and a spring (material: SUS, inner diameter 10 mm, height 2.0 mm, thickness 0.25 mm, WASHER manufactured by Hosen Co., Ltd.).

The amount of the electrolyte solution used was such that the separator was sufficiently filled with the electrolyte solution (from 0.15 mL to 0.3 mL).

In Example 4, a 6.5 mol/kg solution of potassium bis(fluorosulfonyl)amide in ethylene glycol dimethyl ether (6.5 mol/kg KFSA/DME) was used as an electrolyte solution, and in Comparative Example 3, 1 mol/dm$^3$ solution of hexafluorophosphate potassium salt in ethylene carbonate:diethyl carbonate (volume ratio 1:1) (1 mol/dm$^3$ KPF$_6$/EC:PC) was used.

The measurement was performed at room temperature (25° C.) under charging and discharging conditions in which the charge-discharge current density was set to a constant current mode. Setting the current density to 13 mA/g, constant current charging was performed to a charging voltage of 4.5 V. After charging, constant current discharging was repeated until the charging voltage was 4.5 V, and the discharge end voltage was 2.0 V.

Figure 12:
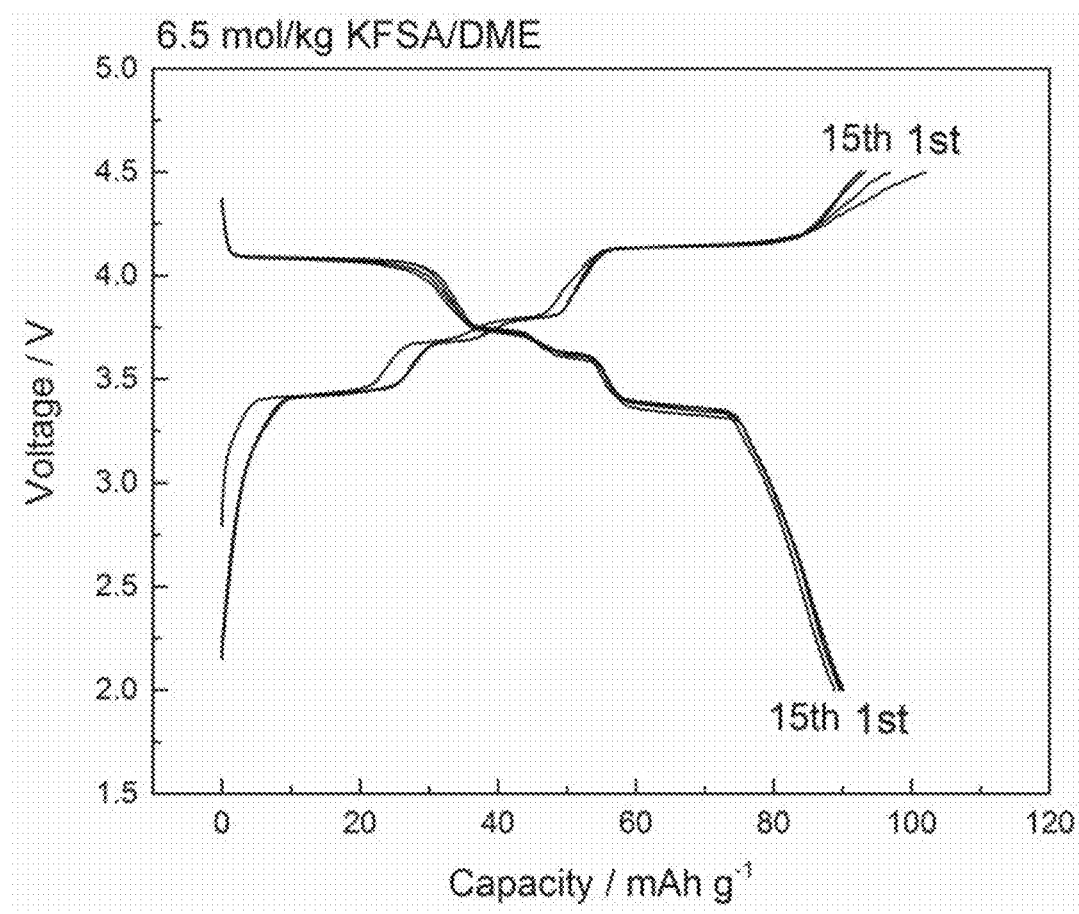
FIG. 12 shows a charge-discharge profile up to the 15th cycle in Example 4.

FIG. 12 shows a charge-discharge profile up to the 15th cycle in Example 4.

Figure 13:
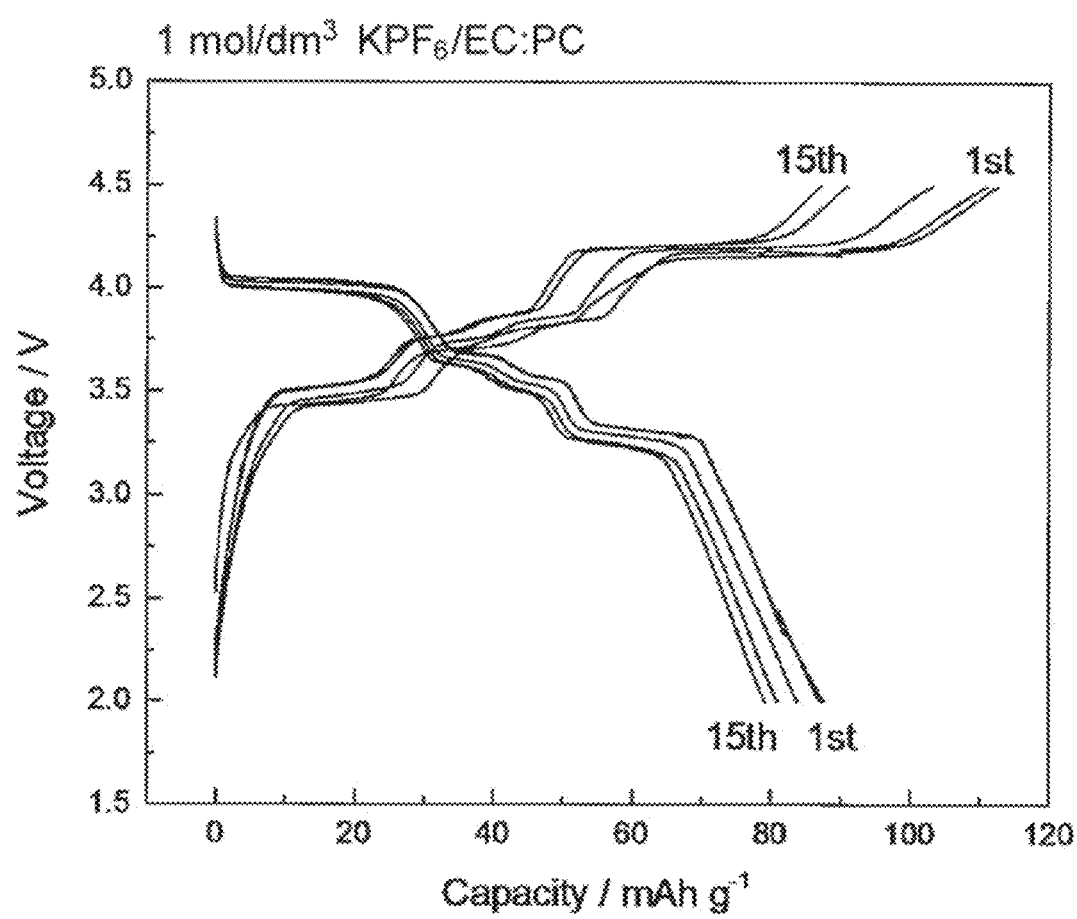
FIG. 13 shows a charge-discharge profile up to the 15th cycle in Comparative Example 3.

FIG. 13 shows a charge-discharge profile up to the 15th cycle in Comparative Example 3.

In FIGS. 12 and 13, the ordinate of the charge-discharge profiles represents the potential (Voltage, unit: V (V vs. K/K$^+$)) based on the standard unipolar potential of potassium metal used, and the abscissa represents the capacity (Capacity, unit: mAh/g).

As shown in FIG. 12, the electrolyte solution according to the present embodiment is excellent in battery characteristics even when using a high potential electrode.

Example 5

<Preparation of Graphite Electrode>

To water as a viscosity-adjusting solvent, 10 parts by mass of polyacrylic acid sodium salt (PANa, manufactured by Kishida Chemical Co., Ltd., molecular weight from 2 million to 6 million) as a binder was added, 90 parts by mass of graphite (manufactured by SECCARBON, LIMITED, SNO3, particle diameter about 3 μm) as a negative electrode active material was further added thereto, and the mixture was mixed and stirred in a mortar, and a negative electrode mixture slurry was obtained.

The obtained negative electrode mixture slurry was applied onto an aluminum foil as a negative electrode current collector, and dried in a vacuum dryer at 150° C., and an electrode sheet was obtained. The electrode sheet was punched into a circle having a diameter of 10 mm with an electrode punching machine, and the disk was used as a graphite electrode.

<Measurement of Charging and Discharging when Using Graphite Electrode>

A coin cell was prepared in the same manner as in Example 3 except that a 6.5 mol/kg solution of potassium bis(fluorosulfonyl)amide in ethylene glycol dimethyl ether (6.5 mol/kg KFSA/DME) was used as the electrolyte solution and the graphite electrode obtained above was used as the negative electrode.

The measurement was performed at room temperature (25° C.) under charging and discharging conditions in which the charge current density was set to a constant current mode, and the discharge current density was set to a constant current-constant voltage mode. Setting the current density to 25 mA/g, constant current charging was performed to a charging voltage of 2.0 V. After charging, constant current discharging was performed until the discharge end voltage was 0.002 V, and constant voltage discharge was performed at 0.002 V for 5 hours, and charge and discharge were repeated.

Figure 14:
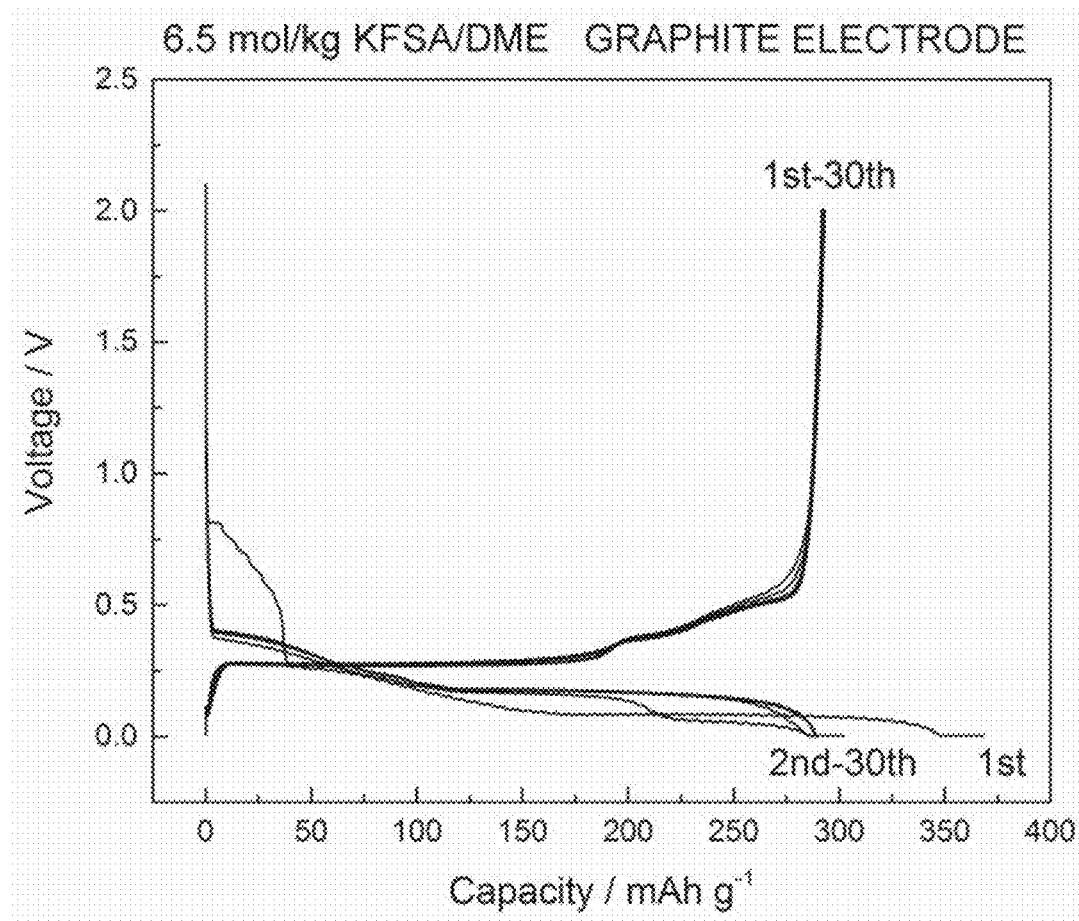
FIG. 14 shows a charge-discharge profile up to the 30th cycle in Example 5.

FIG. 14 shows a charge-discharge profile up to the 30th cycle in Example 5.

In FIG. 14, the ordinate of the charge-discharge profiles represents the potential (Voltage, unit: V (V vs. K/K$^+$)) based on the standard unipolar potential of potassium metal used, and the abscissa represents the capacity (Capacity, unit: mAh/g).

Figure 15:
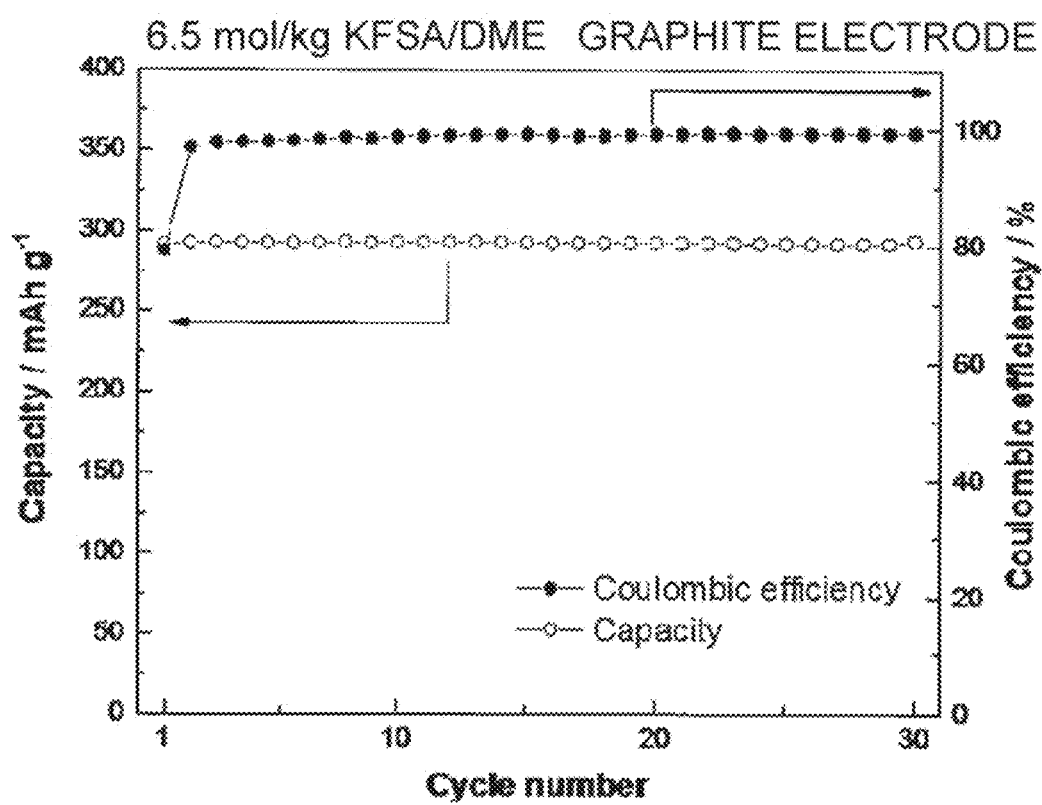
FIG. 15 shows a diagram showing a change in discharge capacity in the course of a cycle when the electrolyte solution of Example 5 is used.

FIG. 15 shows a diagram showing a change in discharge capacity in the course of a cycle when the electrolyte solution of Example 5 is used.

The ordinate in FIG. 15 represents the discharge capacity (Capacity, unit: mAh/g) and the coulombic efficiency (Coulombic efficiency), and the abscissa represents the cycle number.

As shown in FIGS. 14 and 15, the electrolyte solution according to the present embodiment is excellent in battery characteristics even when a graphite electrode is used, and a potassium ion battery in which charge-discharge capacity is not easily deteriorated even after repeated charging and discharging can be obtained.

Example 6

A coin cell was prepared in the same manner as Example 4 except that $K_2Mn[Fe(CN)_6]$ was used in place of $KFeSO_4F$. A charging and discharging measurement was performed in the same manner as in Example 4 except that the charging voltage was changed to 4.35 V.

Figure 16:
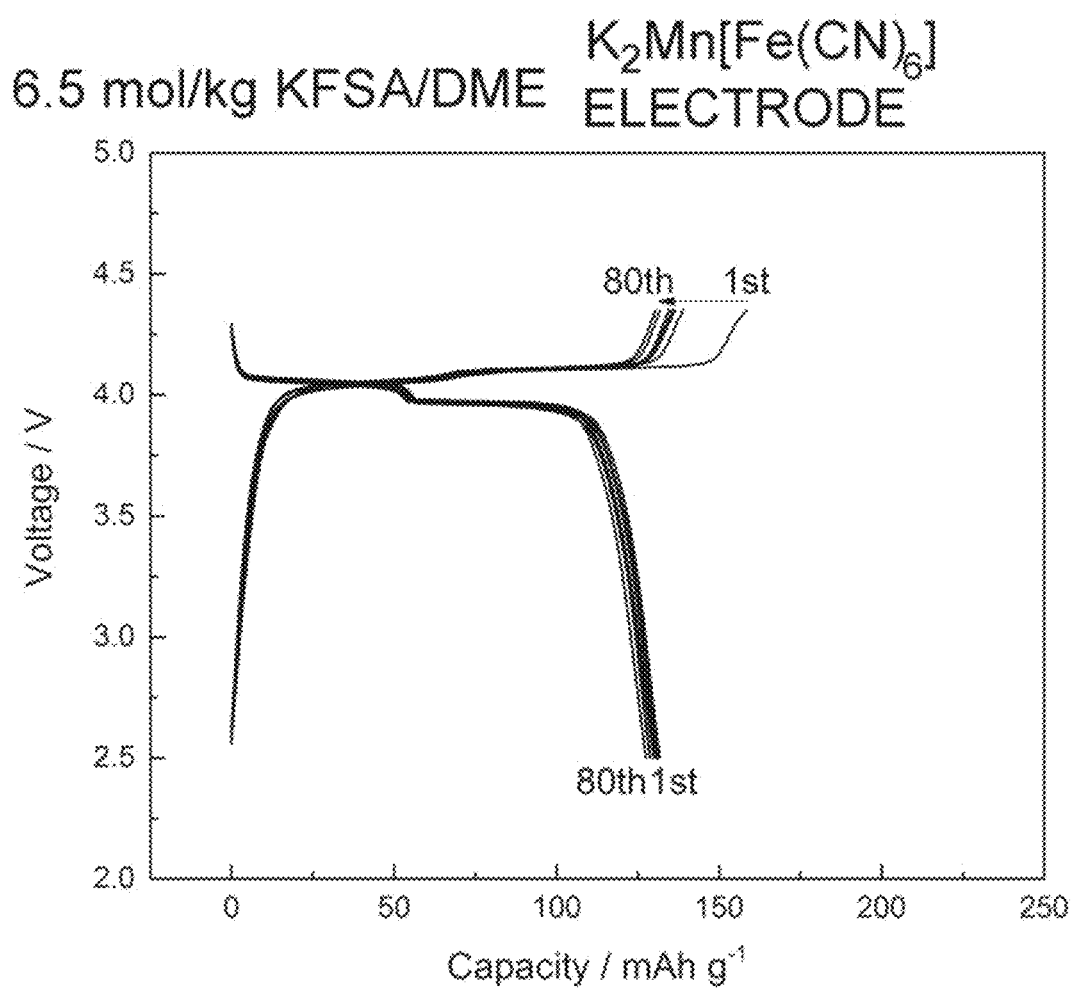
FIG. 16 shows a charge-discharge profile up to 80th cycle in Example 6.

FIG. 16 shows a charge-discharge profile up to the 80th cycle in Example 6.

In FIG. 16, the ordinate of the charge-discharge profiles represents the potential (Voltage, unit: V (V vs. K/K$^+$)) based on the standard unipolar potential of potassium metal used, and the abscissa represents the capacity (Capacity, unit: mAh/g).

Figure 17:
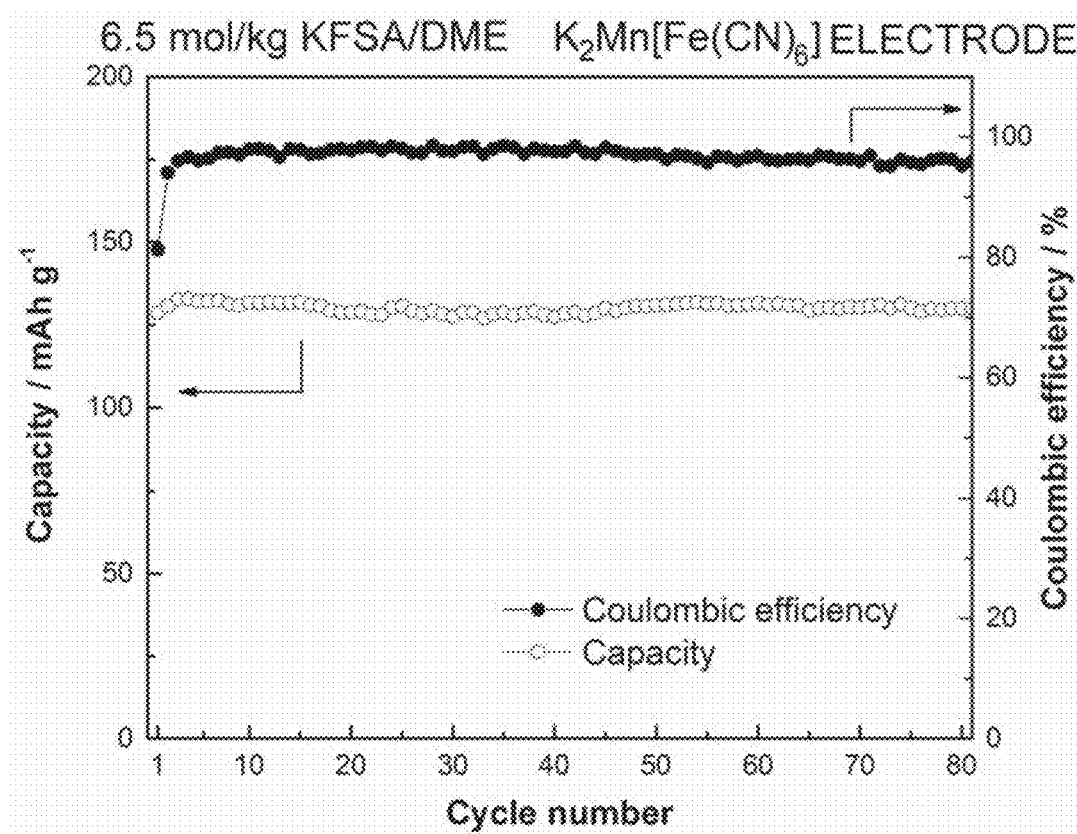
FIG. 17 shows a diagram showing a change in discharge capacity in the course of a cycle when a coin cell (electrolyte solution) of Example 6 is used.

FIG. 17 shows a diagram showing a change in discharge capacity in the course of a cycle when the coin cell (electrolyte solution) of Example 6 is used.

The ordinate in FIG. 17 represents the discharge capacity (Capacity, unit: mAh/g) and the coulombic efficiency, and the abscissa represents the cycle number.

As shown in FIGS. 16 and 17, the electrolyte solution according to the present embodiment is excellent in battery characteristics even when a graphite electrode is used, and a potassium ion battery in which charge-discharge capacity is not easily deteriorated even after repeated charging and discharging can be obtained.

Example 7

A positive electrode was prepared in the same manner as in Example 4 except that $KVPO_4F$ was used in place of $KFeSO_4F$. A coin cell was prepared in the same manner as in Example 4 except that a 10 mol/kg 6.5 mol/kg solution of potassium bis(fluorosulfonyl)amide in ethylene carbonate:propylene carbonate (volume ratio 1:1) (10 mol/kg KFSA/EC:PC) was used as the electrolyte solution. A charging and discharging measurement was performed in the same manner as in Example 4 except that the charging voltage was changed to 5.0 V.

Figure 18:
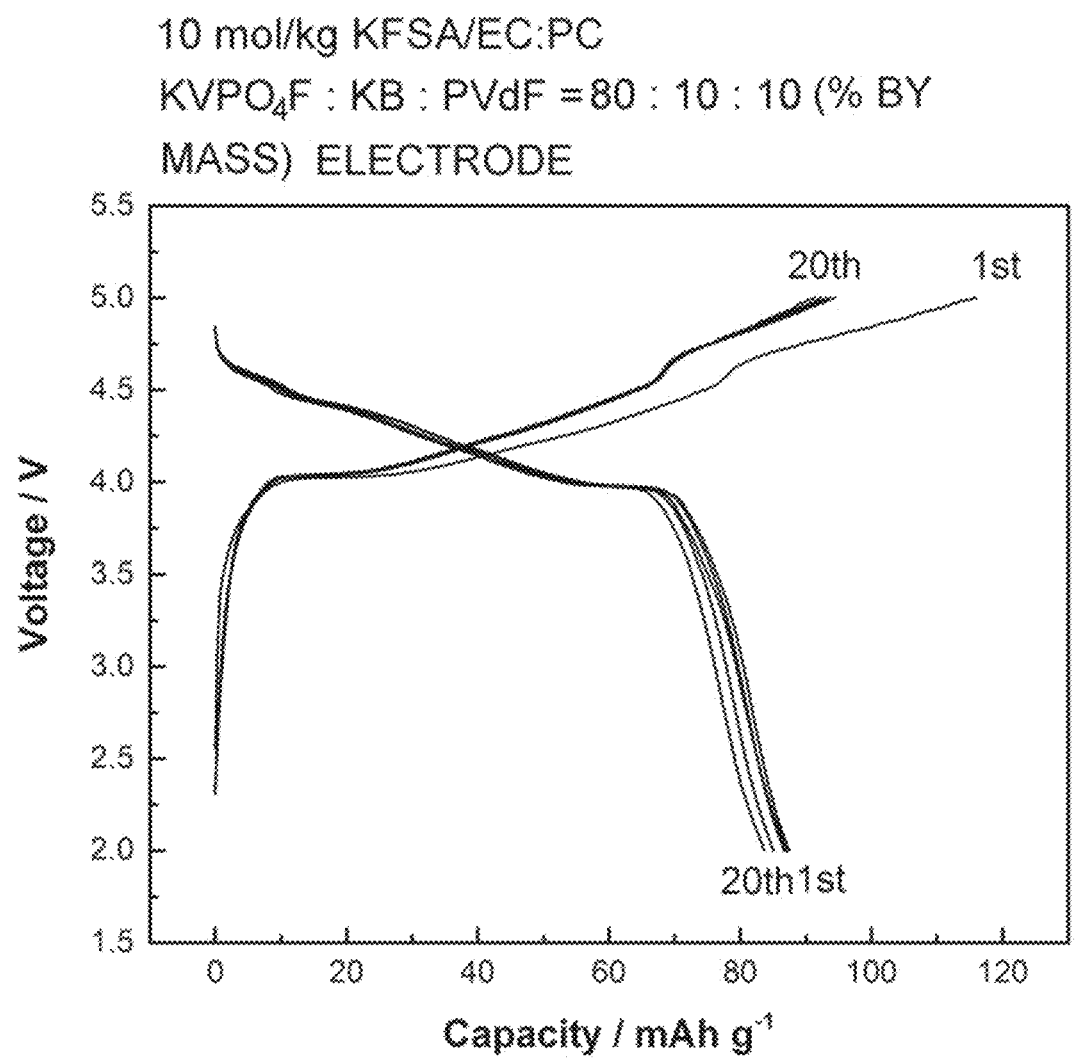
FIG. 18 shows a charge-discharge profile up to the 20th cycle in Example 7.

FIG. 18 shows a charge-discharge profile up to the 20th cycle in Example 7.

In FIG. 18, the ordinate of the charge-discharge profiles represents the potential (Voltage, unit: V (V vs. K/K$^+$)) based on the standard unipolar potential of potassium metal used, and the abscissa represents the capacity (Capacity, unit: mAh/g).

As shown in FIG. 18, the electrolyte solution according to the present embodiment is excellent in battery characteristics even when using a high potential electrode.

Example 8

A coin cell was prepared in the same manner as in Example 4 except that a 10 mol/kg solution of potassium bis(fluorosulfonyl)amide in ethylene carbonate:propylene carbonate (volume ratio 1:1) (10 mol/kg KFSA/EC:PC) was used as the electrolyte solution. A charging and discharging measurement was performed in the same manner as in Example 4.

Figure 19:
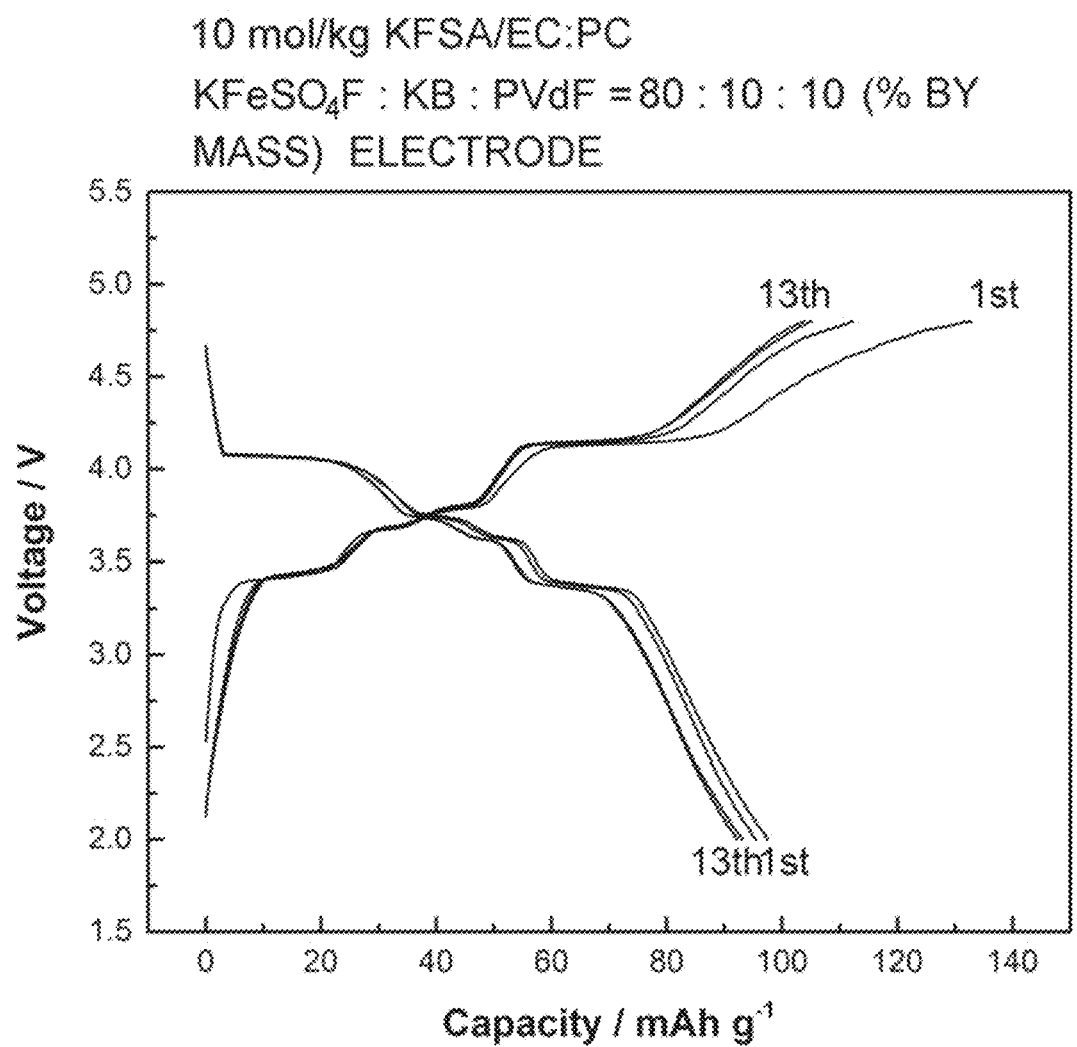
FIG. 19 shows a charge-discharge profile up to the 13th cycle in Example 8.

FIG. 19 shows a charge-discharge profile up to the 13th cycle in Example 8.

In FIG. 19, the ordinate of the charge-discharge profiles represents the potential (Voltage, unit: V (V vs. K/K$^+$)) based on the standard unipolar potential of potassium metal used, and the abscissa represents the capacity (Capacity, unit: mAh/g).

As shown in FIG. 19, the electrolyte solution according to the present embodiment is excellent in battery characteristics even when using a high potential electrode.

Example 9

A coin cell was prepared in the same manner as in Example 5 except that a 10 mol/kg solution of potassium bis(fluorosulfonyl)amide in ethylene carbonate:propylene carbonate (volume ratio 1:1) (10 mol/kg KFSA/EC:PC) was used as the electrolyte solution. A charging and discharging measurement was performed in the same manner as in Example 5.

Figure 20:
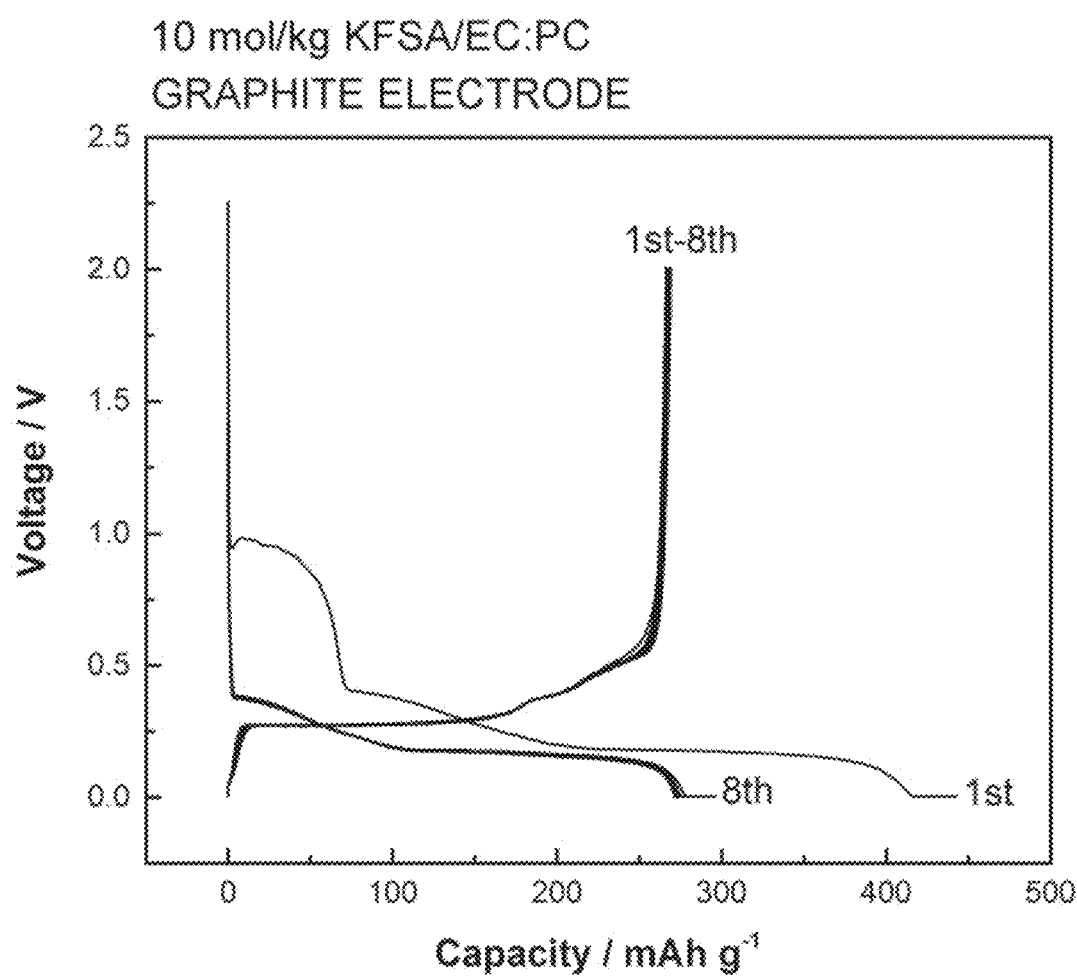
FIG. 20 shows a charge-discharge profile up to the 8th cycle in Example 9.

FIG. 20 shows a charge-discharge profile up to the 8th cycle in Example 9.

In FIG. 20, the ordinate of the charge-discharge profiles represents the potential (Voltage, unit: V (V vs. K/K$^+$)) based on the standard unipolar potential of potassium metal used, and the abscissa represents the capacity (Capacity, unit: mAh/g).

As shown in FIG. 20, the electrolyte solution according to the present embodiment is excellent in battery characteristics even when using a high potential electrode.

(Examples 10 and 11)

Evaluation of passivity formation (aluminum corrosion) was performed in the same manner as in Example 1 except that, as the electrolyte solution, 2 mol/kg solution of potassium bis(fluorosulfonyl)amide in ethylene glycol dimethyl ether (2 mol/kg KFSA/DME) was used in Example 10 and 4 mol/kg solution of potassium bis(fluorosulfonyl)amide in ethylene glycol dimethyl ether (4 mol/kg KFSA/DME) was used in Example 11.

Figure 21:
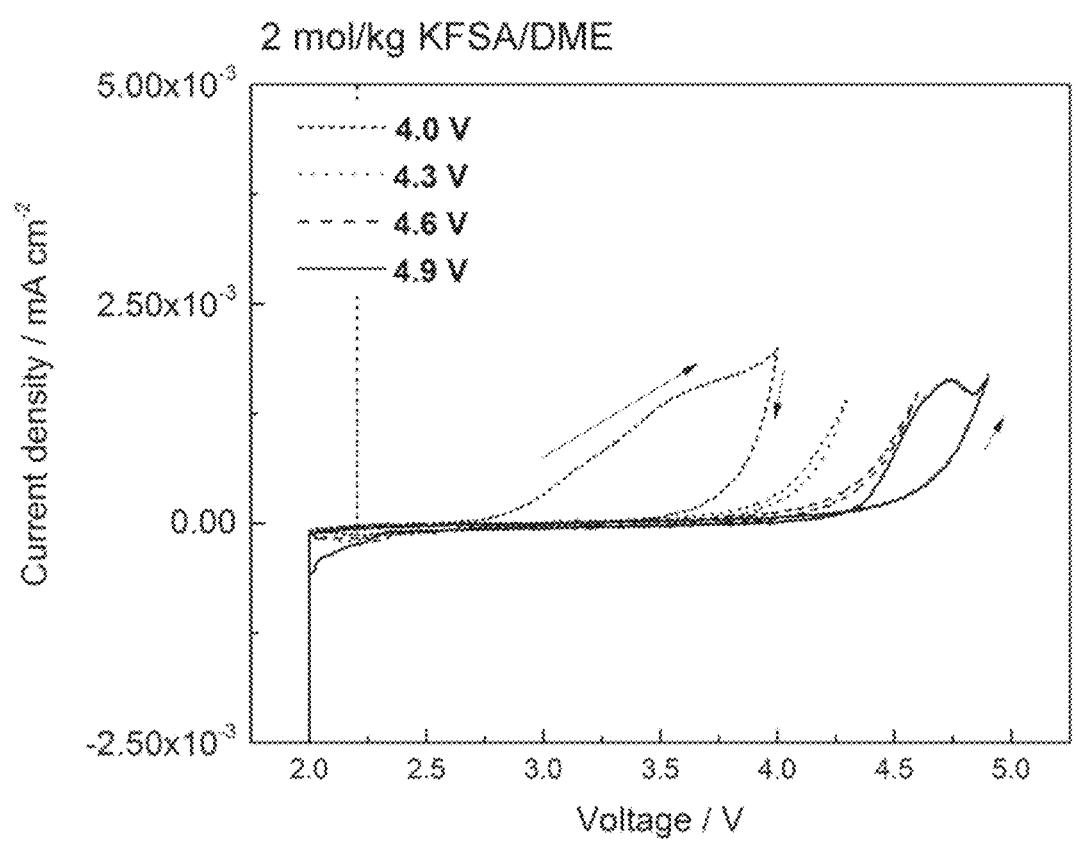
FIG. 21 shows an enlarged view of CV curves when an electrolyte solution of Example 10 is used.
Figure 22:
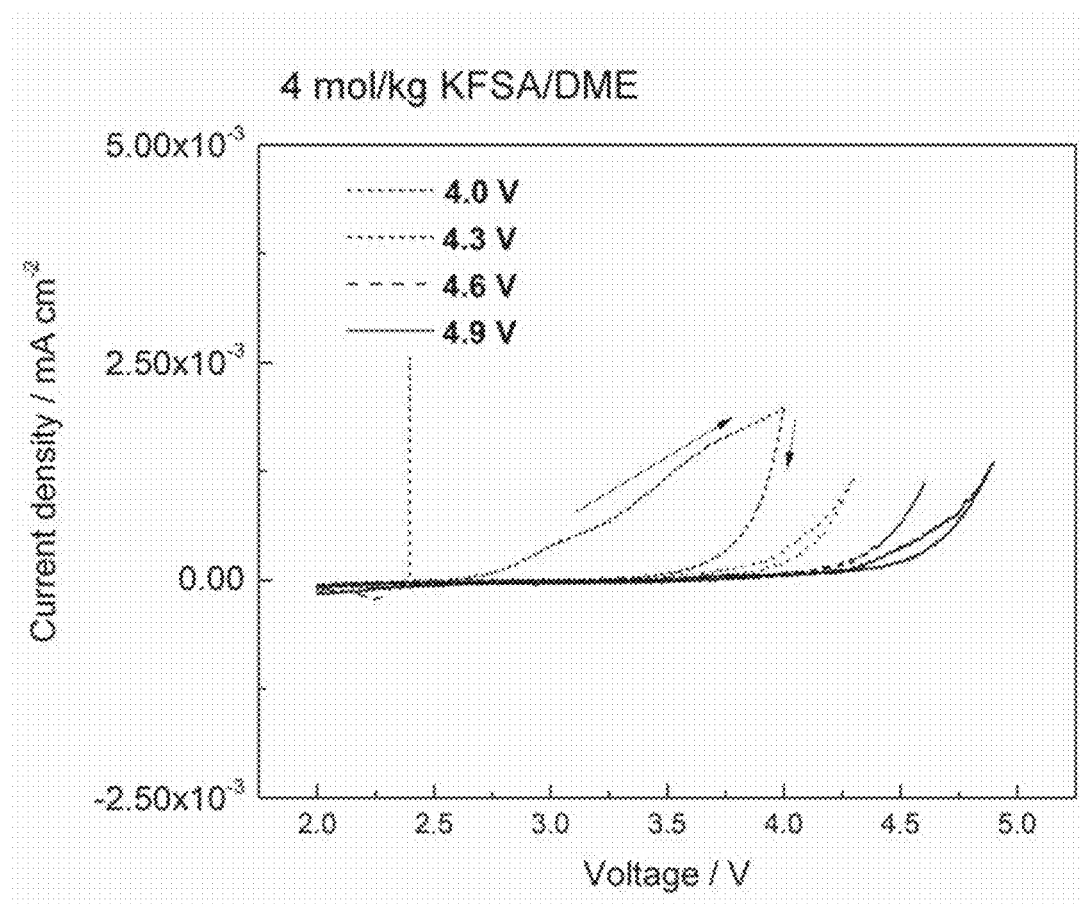
FIG. 22 shows an enlarged view of CV curves when an electrolyte solution of Example 11 is used.
Figure 23:
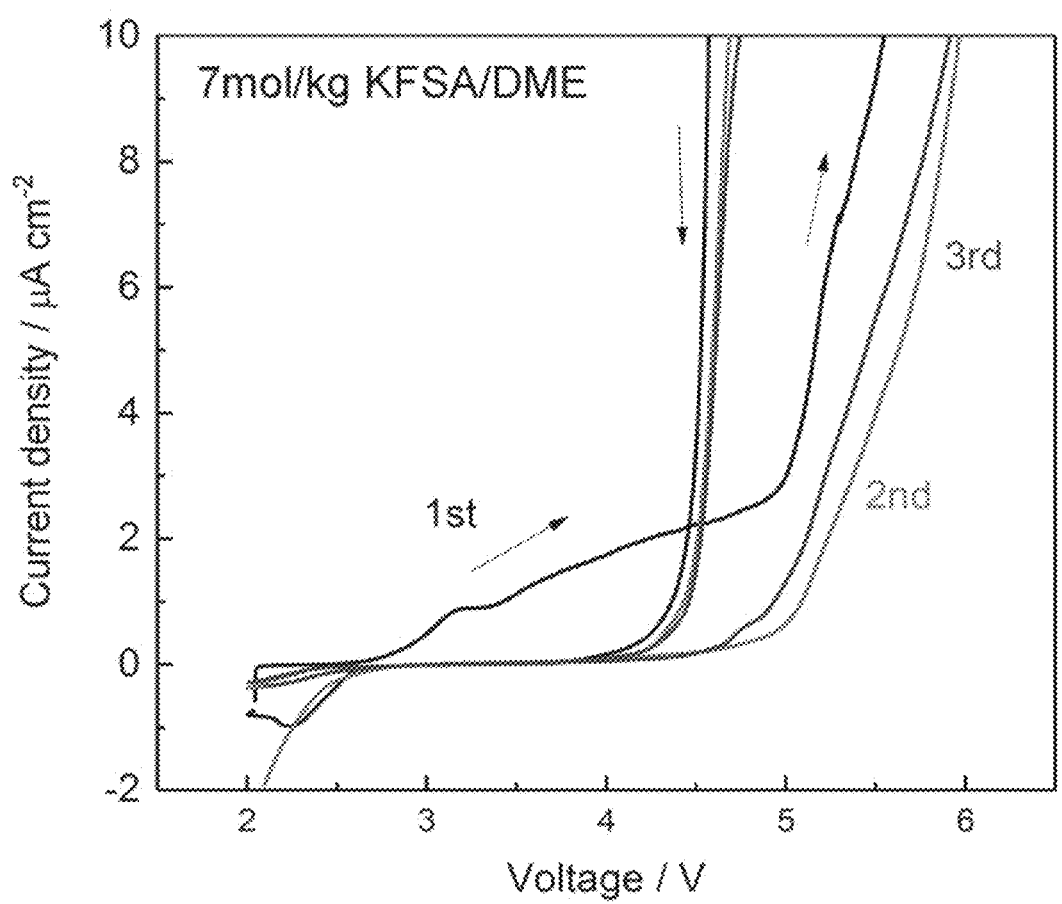
FIG. 23 shows CV curves when an electrolyte solution of Example 12 is used.
Figure 24:
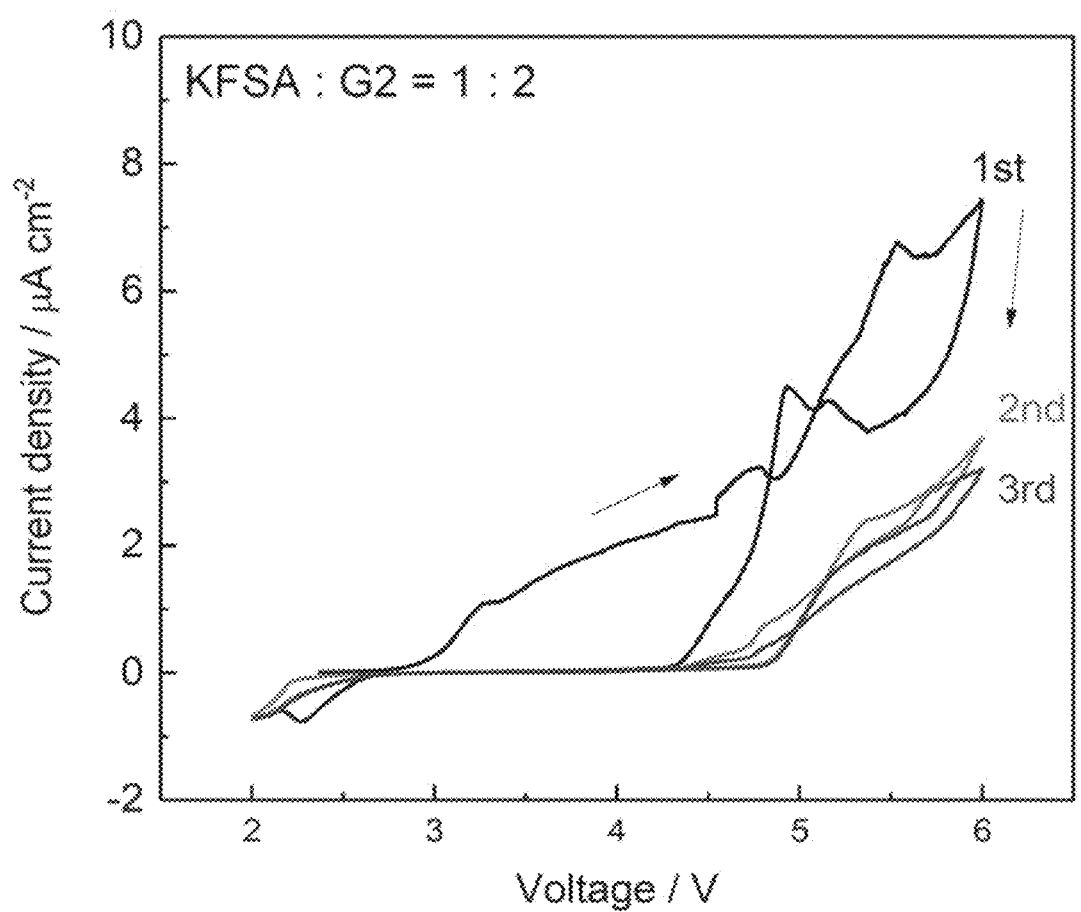
FIG. 24 shows CV curves when an electrolyte solution of Example 13 is used.
Figure 25:
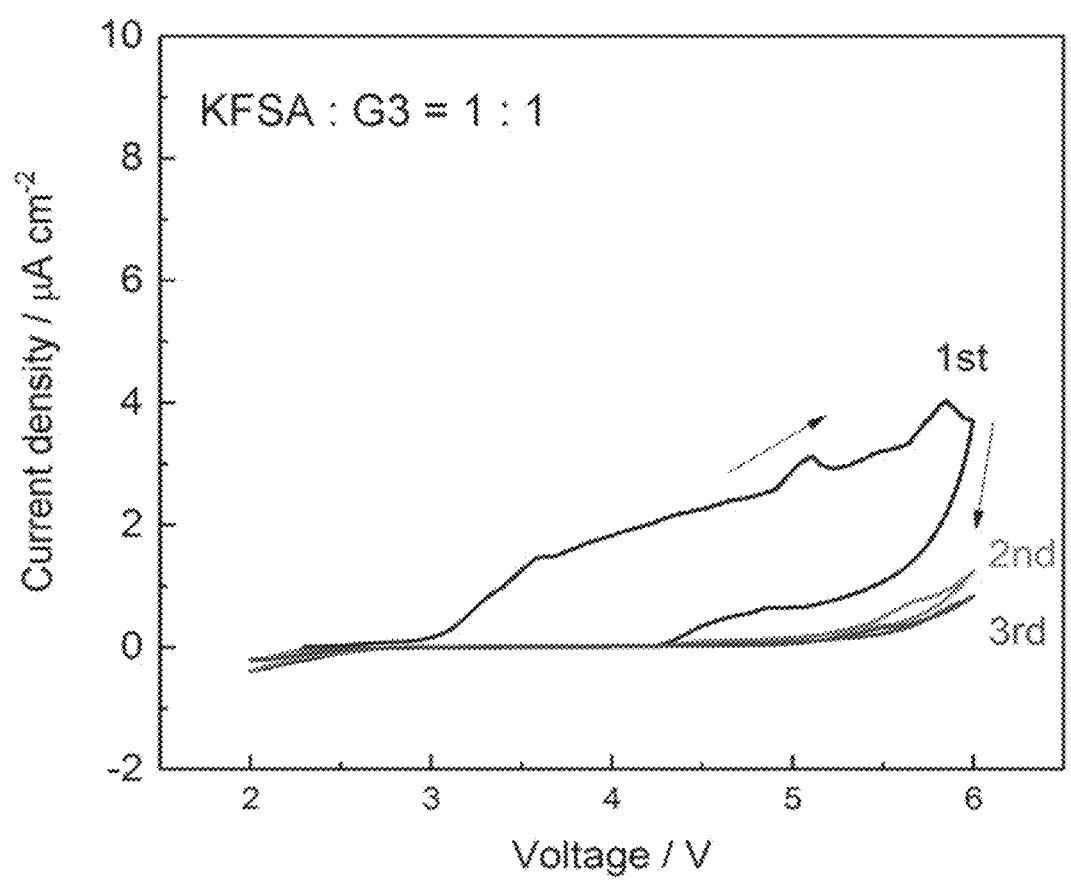
FIG. 25 shows CV curves when an electrolyte solution of Example 14 is used.
Figure 26:
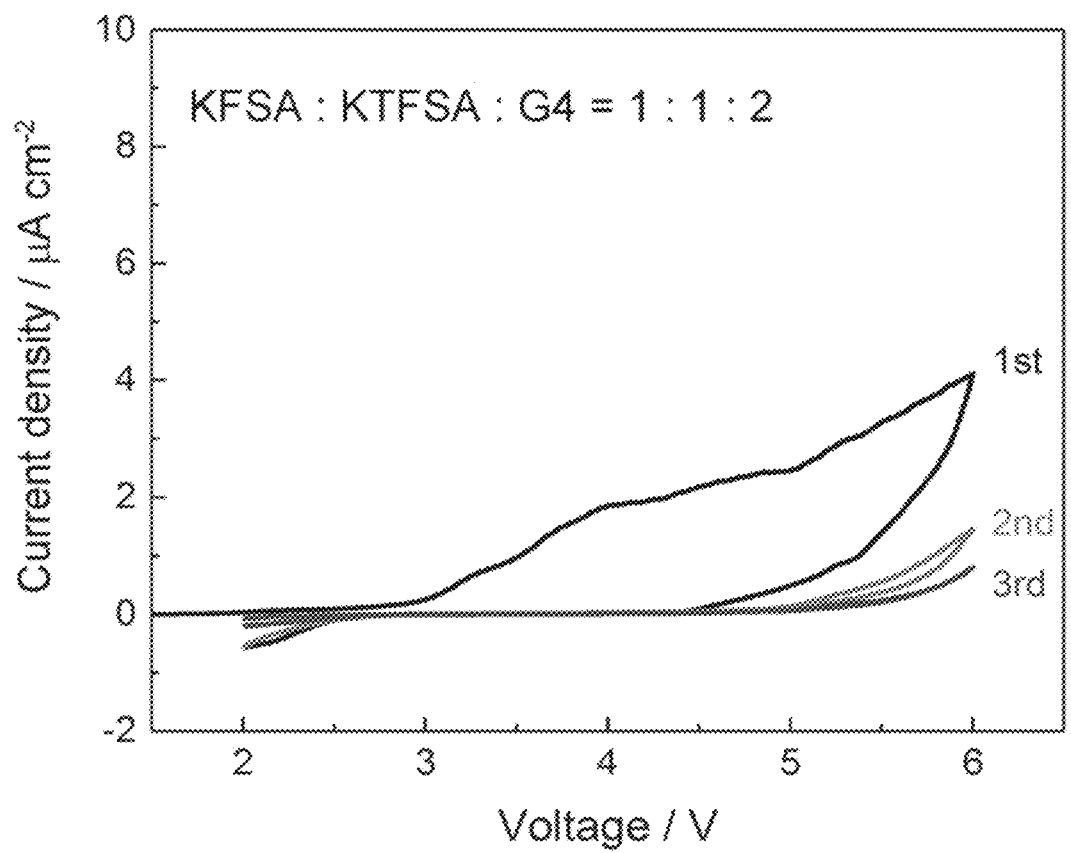
FIG. 26 shows CV curves when an electrolyte solution of Example 15 is used.

The evaluation results are shown in FIGS. 21 and 22.

In FIGS. 21 and 22, the ordinate represents current density (unit: mA/cm$^2$), and the abscissa represents potential (Voltage, unit: V (V vs. K/K$^+$)) based on the standard unipolar potential of potassium metal.

FIG. 21 shows an enlarged view of CV curves when an electrolyte solution of Example 10 is used.

FIG. 22 shows an enlarged view of CV curves when an electrolyte solution of Example 11 is used.

Comparing FIG. 3, FIG. 21, and FIG. 22, in FIG. 21, when the voltage was swept up to 4.9 V, a slight peak due to oxidation of aluminum was observed. On the other hand, in FIG. 3 and FIG. 22, the oxidation peak was not observed.

Therefore, the electrolyte solution according to the present embodiment is considered to be excellent in passive formation at a specific concentration or higher.

Examples 12 to 15

Electrolyte solutions were each prepared by mixing the potassium salt compound shown below and a solvent in such a manner that the solution had the concentration of the potassium salt compound shown below.

Example 12: 7.0 mol/kg solution of potassium bis(fluorosulfonyl)amide in ethylene glycol dimethyl ether (7 mKFSA/DME)

Example 13: 3.7 mol/kg solution of potassium bis(fluorosulfonyl)amide in diethylene glycol dimethyl ether (KFSA:G2=1:2 (molar ratio))

Example 14: 5.6 mol/kg solution of potassium bis(fluorosulfonyl)amide in triethylene glycol dimethyl ether (KFSA:G3=1:1 (molar ratio))

Example 15: 4.5 mol/kg solution of potassium bis(fluorosulfonyl)amide:potassium bis(trifluoromethanesulfonyl)amide (molar ratio 1:1) tetraethylene glycol dimethyl ether (KFSA:KTFSA:G4=1:1:2 (molar ratio))

Details of the used compounds other than those described above are shown below.

Diethylene glycol dimethyl ether (G2): manufactured by Kishida Chemical Co., Ltd.

Triethylene glycol dimethyl ether (G3): manufactured by Kishida Chemical Co., Ltd.

Tetraethylene glycol dimethyl ether (G4): manufactured by Kishida Chemical Co., Ltd.

A cyclic voltammetry (CV) measurement was performed using each obtained electrolyte solution in the same manner as in Example 1.

The evaluation results are shown in FIGS. 23 to 26.

In FIGS. 23 to 26, the ordinate represents current density (unit: $\mu A/cm^2$), and the abscissa represents potential (Voltage, unit: V (V vs. $K/K^+$)) based on the standard unipolar potential of potassium metal.

As shown in FIGS. 23 to 26, the electrolyte solution according to the present embodiment is excellent in the corrosion suppression of aluminum and excellent in the passivity formation.

A coin cell was prepared in the same manner as in Example 6 using each of the obtained electrolyte solutions. A charging and discharging measurement was performed in the same manner as in Example 4 except that the charging voltage was changed to 4.35 V.

Figure 27:
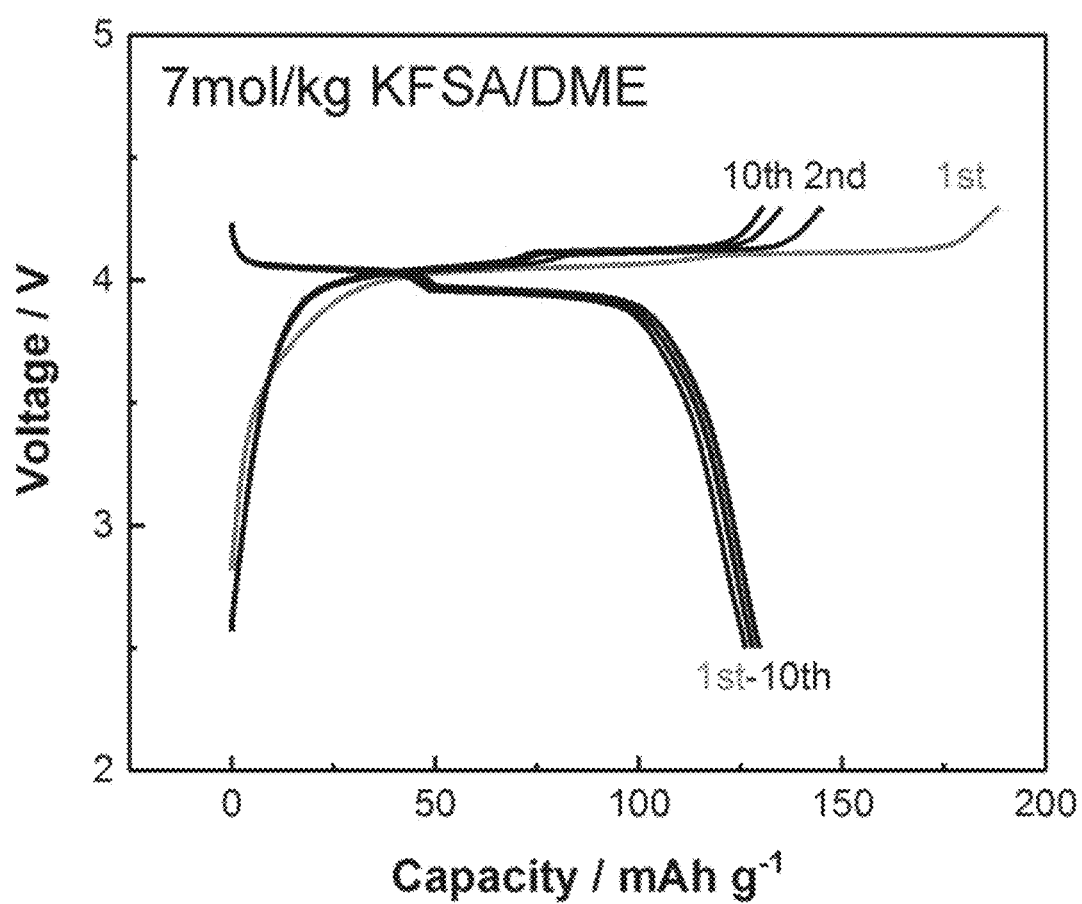
FIG. 27 shows a charge-discharge profile up to the 10th cycle in Example 12.

FIG. 27 shows a charge-discharge profile up to the 10th cycle in Example 12.

Figure 28:
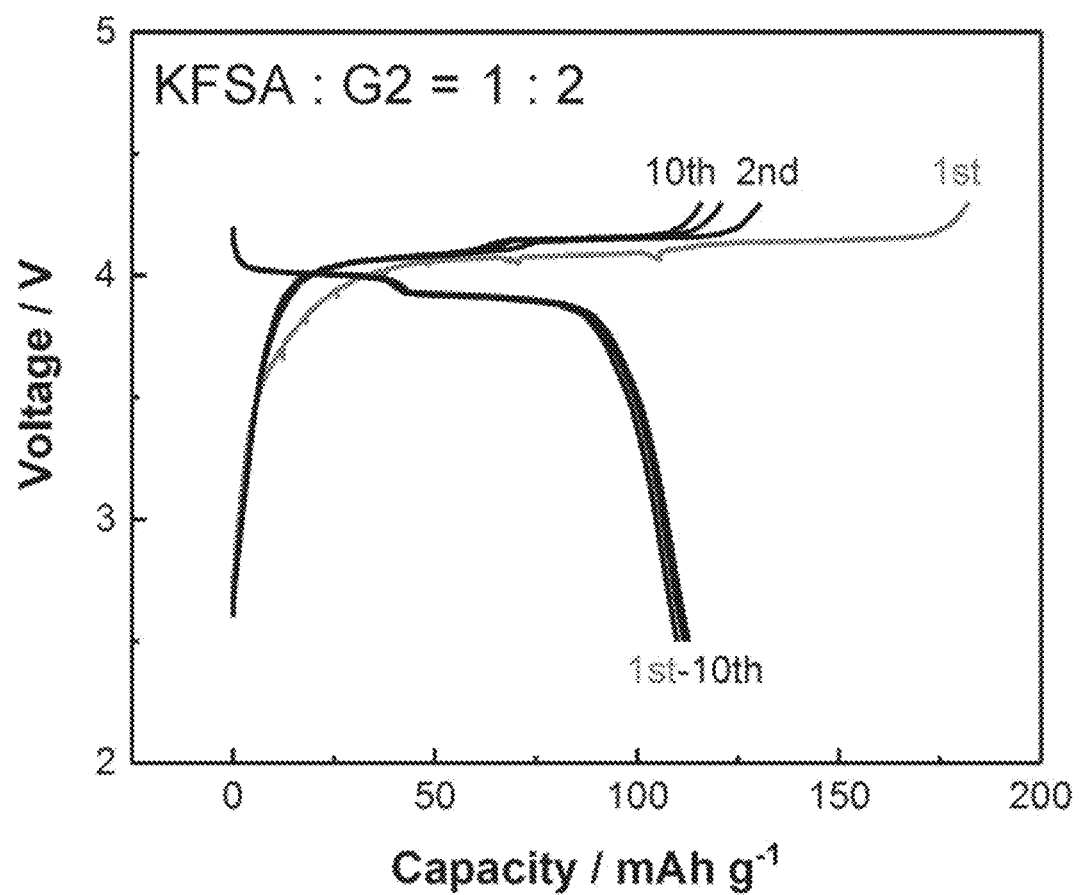
FIG. 28 shows a charge-discharge profile up to the 10th cycle in Example 13.

FIG. 28 shows a charge-discharge profile up to the 10th cycle in Example 13.

Figure 29:
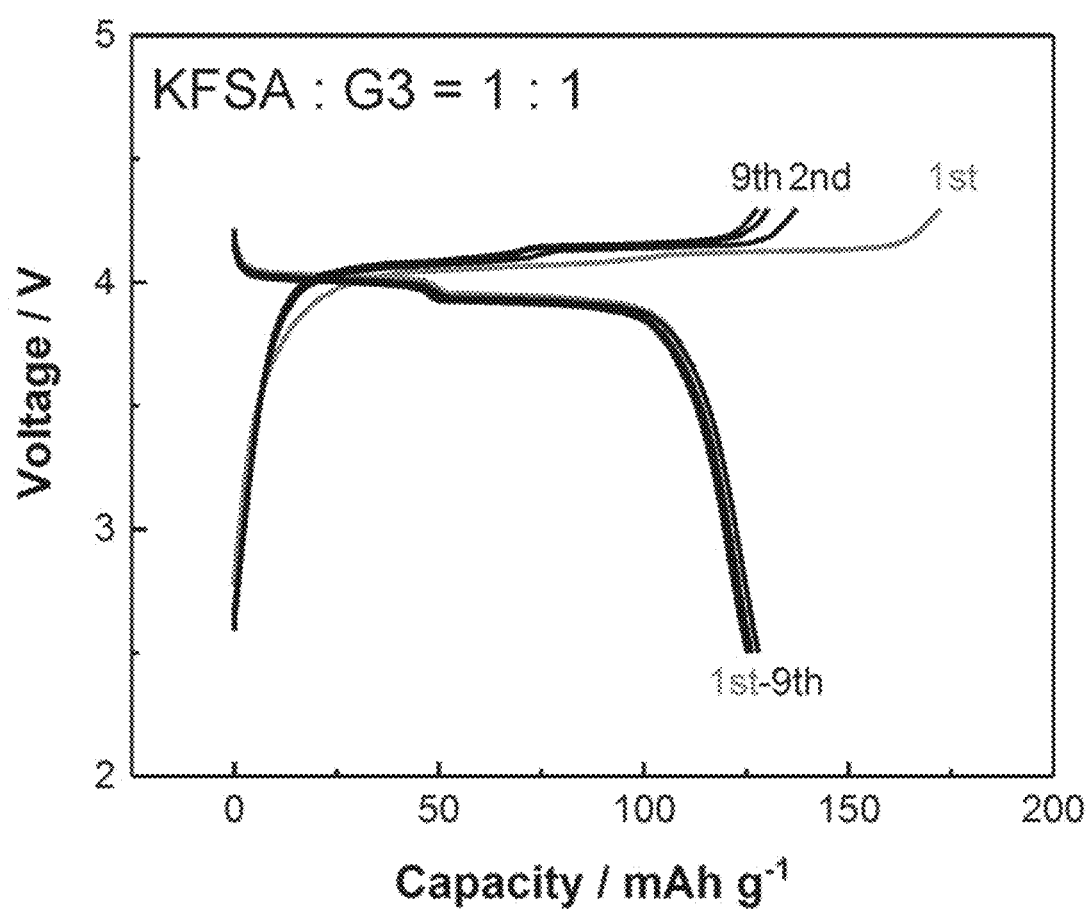
FIG. 29 shows a charge-discharge profile up to the 9th cycle in Example 14.

FIG. 29 shows a charge-discharge profile up to the 9th cycle in Example 14.

Figure 30:
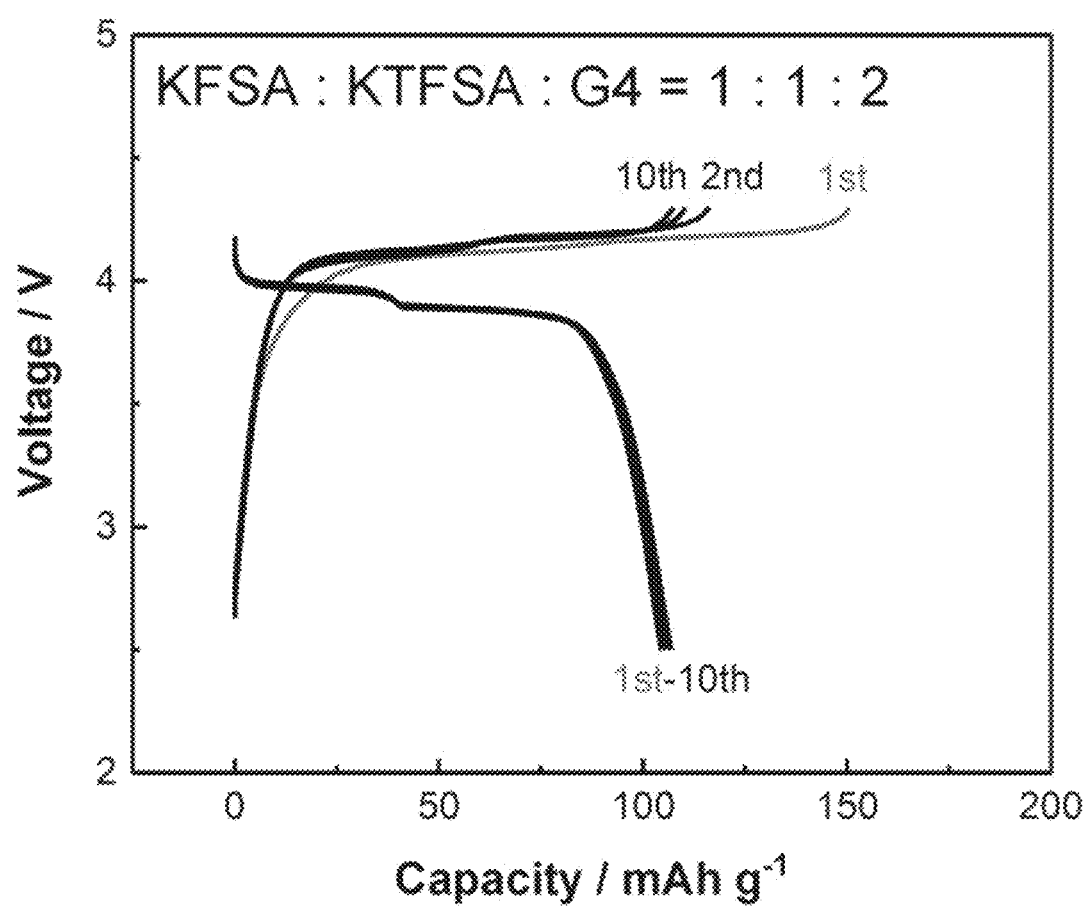
FIG. 30 shows a charge-discharge profile up to the 10th cycle in Example 15.

FIG. 30 shows a charge-discharge profile up to the 10th cycle in Example 15.

In FIGS. 27 to 30, the ordinate of the charge-discharge profiles represents the potential (Voltage, unit: V (V vs. $K/K^+$)) based on the standard unipolar potential of potassium metal used, and the abscissa represents the capacity (Capacity, unit: mAh/g).

As shown in FIGS. 27 to 30, the electrolyte solution according to the present embodiment is excellent in battery characteristics, and a potassium ion battery in which charge-discharge capacity is not easily deteriorated even after repeated charging and discharging can be obtained.

Example 16

Electrolyte solutions were each prepared by mixing the potassium salt compound shown below and a solvent in such a manner that the solution had the concentration of the potassium salt compound shown below.

Example 16: 2.0 mol/kg solution of potassium bis(fluorosulfonyl)amide in ethylene glycol dimethyl ether (2 mKFSA/DME)

A coin cell was prepared in the same manner as in Example 6 using the obtained electrolyte solution of Example 16 or Comparative Example 3. A charging and discharging measurement was performed in the same manner as in Example 4 except that the charging voltage was changed to 4.35 V.

Figure 31:
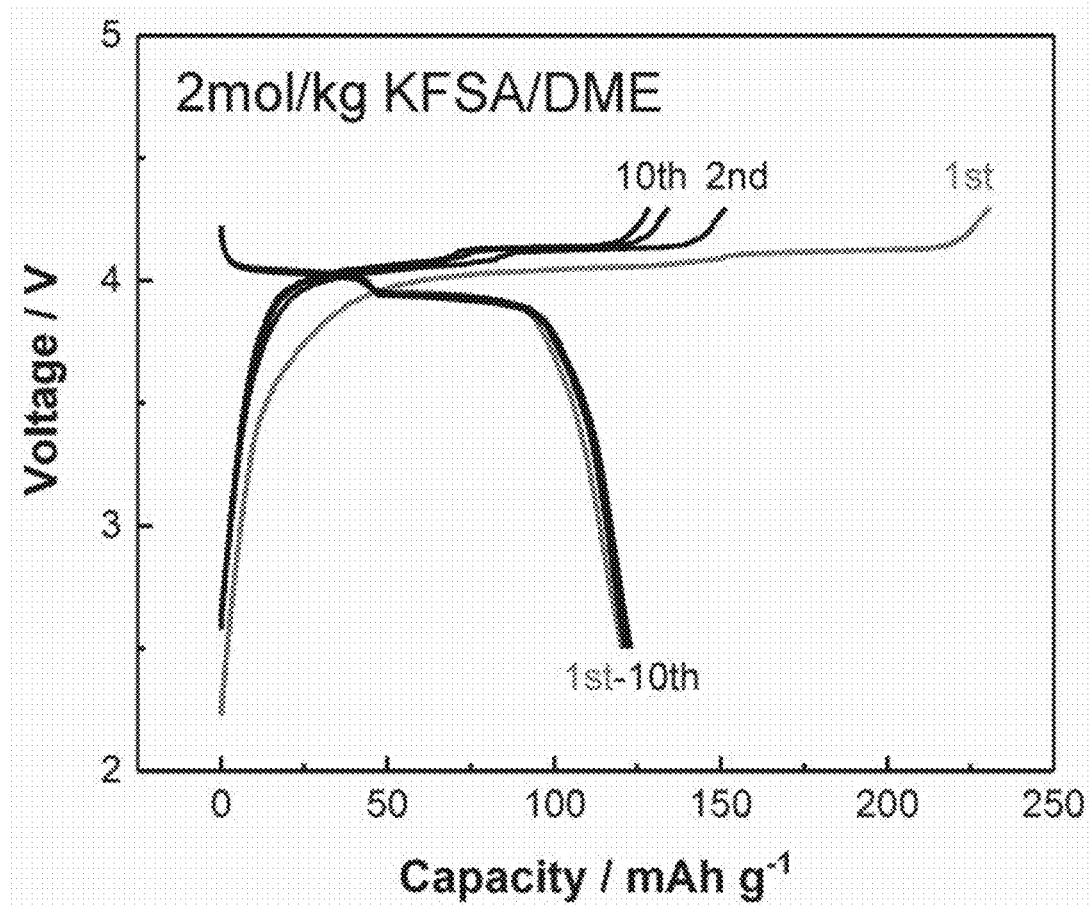
FIG. 31 shows CV curves when an electrolyte solution of Example 16 is used.

FIG. 31 shows a charge-discharge profile up to the 10th cycle in Example 16.

In FIG. 31, the ordinate of the charge-discharge profiles represents the potential (Voltage, unit: V (V vs. $K/K^+$)) based on the standard unipolar potential of potassium metal used, and the abscissa represents the capacity (Capacity, unit: mAh/g).

Figure 32:
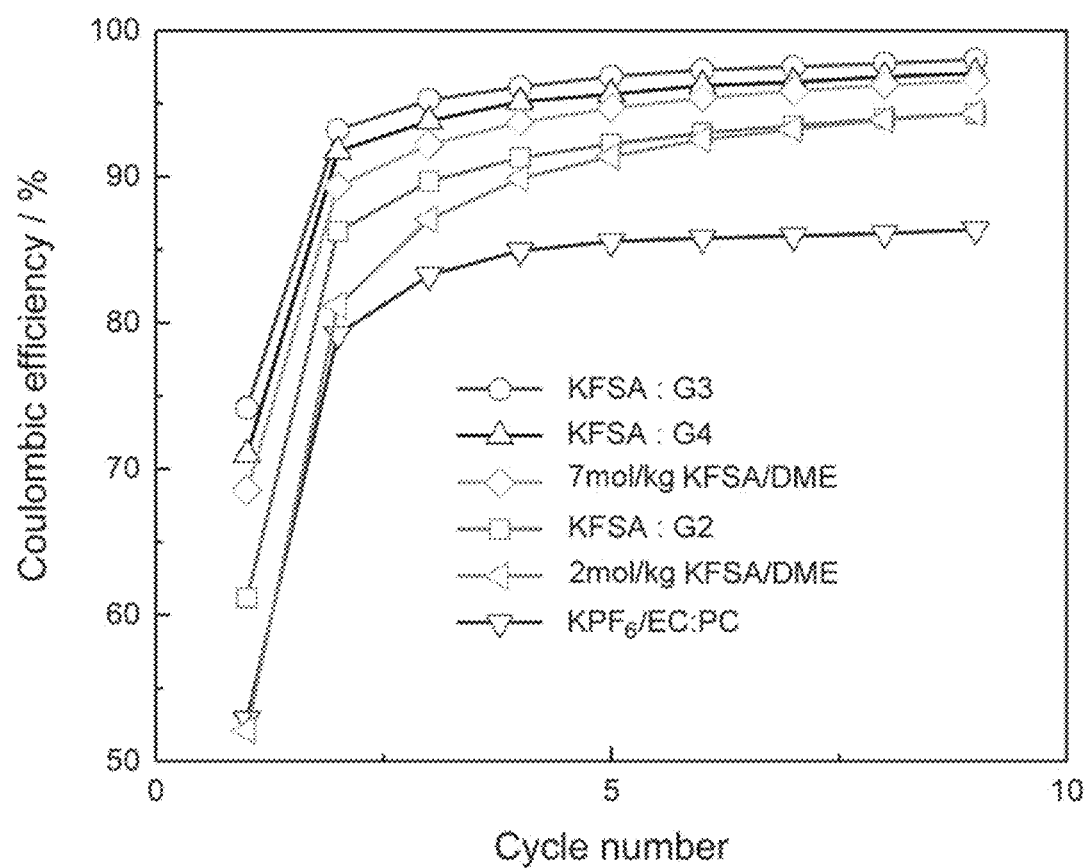
FIG. 32 is a graph showing a change in coulombic efficiency over the course of cycles when electrolyte solutions of Examples 13 to 16 and Example 3 are used.

Furthermore, FIG. 32 is a graph showing a change in coulombic efficiency over the course of cycles when electrolyte solutions of Examples 13 to 16 and Comparative Example 3 are used.

The ordinate in FIG. 32 represents the coulombic efficiency (Coulombic efficiency), and the abscissa represents the cycle number.

As shown in FIG. 32, the electrolyte solution according to the present embodiment is excellent in battery characteristics, and a potassium ion battery in which charge-discharge capacity is not easily deteriorated even after repeated charging and discharging can be obtained.

As shown in FIG. 32, when at least one solvent selected from the group consisting of ethylene glycol dimethyl ether, diethylene glycol dimethyl ether, triethylene glycol dimethyl ether, and tetraethylene glycol dimethyl ether, particularly at least one solvent selected from the group consisting of triethylene glycol dimethyl ether and tetraethylene glycol dimethyl ether, is used as the solvent, the electrolyte solution according to the present embodiment is more excellent in battery characteristics.

The disclosure of Japanese Patent Application No. 2017-9526 filed on Jan. 23, 2017 is hereby incorporated by reference in its entirety.

All Documents, Patent Applications, and technical standards described herein are incorporated by reference herein to the same extent as if each of the Documents, Patent Applications, and technical standards had been specifically and individually indicated to be incorporated by reference.

REFERENCE SIGNS LIST

10: Potassium ion battery, 12: Battery case (negative electrode side), 14: Gasket, 16: Negative electrode, 18: Separator, 20: Positive electrode, 22: Spacer, 24: Spring, 26: Battery case (positive electrode side)

What is claimed is:

1. An electrolyte solution for a potassium ion battery, the electrolyte solution comprising:
   at least one potassium salt compound selected from the group consisting of potassium bis(trifluoromethanesulfonyl)amide and potassium bis(fluorosulfonyl)amide; and
   at least one solvent selected from the group consisting of ethylene glycol dimethyl ether, diethylene glycol dimethyl ether, triethylene glycol dimethyl ether, tetraethylene glycol dimethyl ether, pentaethylene glycol dimethyl ether, ethylene carbonate, and propylene carbonate,
   wherein a concentration of the potassium salt compound in the electrolyte solution is from 6.0 mol/kg to 12.0 mol/kg.

2. The electrolyte solution for a potassium ion battery according to claim 1, wherein the potassium salt compound includes potassium bis(fluorosulfonyl)amide.

3. The electrolyte solution for a potassium ion battery according to claim 1, wherein the solvent includes ethylene glycol dimethyl ether.

4. The electrolyte solution for a potassium ion battery according to claim 1, wherein the concentration of the potassium salt compound in the electrolyte solution is from 6.0 mol/kg to 7.5 mol/kg.

5. A potassium ion battery, comprising the electrolyte solution for a potassium ion battery according claim 1.

6. An electrolyte solution for a potassium ion capacitor, the electrolyte solution comprising:
- at least one potassium salt compound selected from the group consisting of potassium bis(trifluoromethanesulfonyl)amide and potassium bis(fluorosulfonyl)amide; and
- at least one solvent selected from the group consisting of ethylene glycol dimethyl ether, diethylene glycol dimethyl ether, triethylene glycol dimethyl ether, tetraethylene glycol dimethyl ether, pentaethylene glycol dimethyl ether, ethylene carbonate, and propylene carbonate,
- wherein a concentration of the potassium salt compound in the electrolyte solution is from 6.0 mol/kg to 12.0 mol/kg.

7. The electrolyte solution for a potassium ion capacitor according to claim 6, wherein the potassium salt compound includes potassium bis(fluorosulfonyl)amide.

8. The electrolyte solution for a potassium ion capacitor according to claim 6, wherein the solvent includes ethylene glycol dimethyl ether.

9. The electrolyte solution for a potassium ion capacitor according to claim 6, wherein the concentration of the potassium salt compound in the electrolyte solution is from 6.0 mol/kg to 7.5 mol/kg.

10. A potassium ion capacitor, comprising the electrolyte solution for a potassium ion capacitor according to claim 6.

* * * * *